US010538707B2

(12) United States Patent
Brandhorst, Jr. et al.

(10) Patent No.: US 10,538,707 B2
(45) Date of Patent: *Jan. 21, 2020

(54) MULTISTAGE THERMOLYSIS METHOD FOR SAFE AND EFFICIENT CONVERSION OF CARPET/RUG, POLYMERIC MATERIALS AND OTHER WASTE SOURCES

(71) Applicant: CHZ Technologies, LLC, Austintown, OH (US)

(72) Inventors: Henry W. Brandhorst, Jr., Auburn, AL (US); Ullrich H. Engel, Camberg (DE); Charles T. Ludwig, Auburn, AL (US); Ernest J. Zavoral, Sr., Canfield, OH (US)

(73) Assignee: CHZ Technologies, LLC, Austintown, OH (US)

(*) Notice: Subject to any disclaimer, the term of this patent is extended or adjusted under 35 U.S.C. 154(b) by 51 days.

This patent is subject to a terminal disclaimer.

(21) Appl. No.: 15/729,335

(22) Filed: Oct. 10, 2017

(65) Prior Publication Data

US 2018/0072955 A1 Mar. 15, 2018

Related U.S. Application Data

(63) Continuation of application No. 15/168,413, filed on May 13, 2016, now Pat. No. 9,816,033.

(Continued)

(51) Int. Cl.
*C10B 53/07* (2006.01)
*C08J 11/14* (2006.01)
(Continued)

(52) U.S. Cl.
CPC ............ *C10B 53/07* (2013.01); *C08J 11/14* (2013.01); *C10B 45/00* (2013.01); *C10B 47/00* (2013.01);
(Continued)

(58) Field of Classification Search
CPC .. C10B 47/00; C10B 53/07; B29B 2017/0496; B29B 17/04
See application file for complete search history.

(56) References Cited

U.S. PATENT DOCUMENTS 3,825,464 A * 7/1974 Crowley ............... C08K 5/23
428/96
4,159,241 A 6/1979 Simo et al.
(Continued)

FOREIGN PATENT DOCUMENTS

KR 20120055756 A 6/2012
WO 2015090477 A1 6/2015

OTHER PUBLICATIONS

Zhou, Hui et al., Energy and Fuels, "Polycyclic Aromatic Hydrocarbon Formation from the Pyrolysis/Gasification of Lignin at Different . . . ", pp. 6371-6379. Oct. 2014.

(Continued)

*Primary Examiner* — Jonathan Miller
(74) *Attorney, Agent, or Firm* — McKee, Voorhees & Sease, PLC

(57) ABSTRACT

Clean, safe and efficient methods, systems, and processes for utilizing thermolysis methods to processes to convert various carpet, rug, polymeric materials and other waste sources, such as solid waste, tires, manure, auto shredder residue, glass and carbon fiber composite materials, municipal solid wastes, medical wastes, waste wood and the like into a Clean Fuel Gas and Char source are disclosed. The invention processes the carpet, rug, polymeric material to effectively shred and/or grind the waste source, such as post-consumer carpet remnants and waste, and then process using thermolysis methods to destroy and/or separate halogen and other dangerous components to provide a Clean Fuel Gas and Char source. Additional waste sources, such as solid waste, tires, manure, auto shredder residue, glass and carbon fiber (Continued)

composite materials, municipal solid wastes, medical wastes, waste wood and the like, are suitable for the processing of the invention disclosed.

14 Claims, 11 Drawing Sheets
(11 of 11 Drawing Sheet(s) Filed in Color)

Related U.S. Application Data

(60) Provisional application No. 62/293,184, filed on Feb. 9, 2016, provisional application No. 62/273,751, filed on Dec. 31, 2015.

(51) Int. Cl.

| | | |
|---|---|---|
| *C10B 45/00* | (2006.01) | |
| *C10B 47/00* | (2006.01) | |
| *C10L 3/00* | (2006.01) | |
| *C10K 1/00* | (2006.01) | |
| *C10K 1/12* | (2006.01) | |
| *C10B 47/44* | (2006.01) | |
| *C10B 57/02* | (2006.01) | |
| *C10L 5/44* | (2006.01) | |
| *C10G 1/10* | (2006.01) | |
| *C10K 1/08* | (2006.01) | |
| *B01D 47/00* | (2006.01) | |
| *C10L 5/46* | (2006.01) | |

(52) U.S. Cl.
CPC .............. *C10B 47/44* (2013.01); *C10B 57/02* (2013.01); *C10G 1/10* (2013.01); *C10K 1/002* (2013.01); *C10K 1/08* (2013.01); *C10K 1/122* (2013.01); *C10L 3/00* (2013.01); *C10L 5/447* (2013.01); *B01D 47/00* (2013.01); *C08J 2367/02* (2013.01); *C08J 2377/00* (2013.01); *C10G 2300/1003* (2013.01); *C10L 5/46* (2013.01); *C10L 2200/0469* (2013.01); *C10L 2290/02* (2013.01); *C10L 2290/06* (2013.01); *C10L 2290/10* (2013.01); *C10L 2290/28* (2013.01); *C10L 2290/50* (2013.01); *Y02E 50/10* (2013.01); *Y02E 50/30* (2013.01); *Y02P 20/143* (2015.11)

(56) References Cited

U.S. PATENT DOCUMENTS

| | | | | |
|---|---|---|---|---|
| 4,317,800 | A * | 3/1982 | Sloterdijk | ............... C10B 47/06 588/316 |
| 5,045,177 | A | 9/1991 | Cooper et al. | |
| 5,427,650 | A * | 6/1995 | Holloway | ............... A61L 11/00 162/5 |
| 5,771,822 | A | 6/1998 | Rizzon | |
| 6,084,139 | A * | 7/2000 | Van Der Giessen | ... C10B 53/00 585/240 |
| 6,178,899 | B1 * | 1/2001 | Kaneko | .................. B01D 53/34 110/204 |
| 8,419,902 | B2 * | 4/2013 | Feerer | .................... C10K 1/101 202/118 |
| 8,864,057 | B2 | 10/2014 | Bork et al. | |
| 8,915,199 | B2 | 12/2014 | Bohlig et al. | |
| 2002/0117388 | A1 | 8/2002 | Denison | |
| 2007/0045455 | A1 | 3/2007 | Tuzson et al. | |
| 2008/0028889 | A1 | 2/2008 | Irizarry-Rivera et al. | |
| 2009/0020052 | A1 | 1/2009 | Becchetti et al. | |
| 2009/0062581 | A1 | 3/2009 | Appel et al. | |
| 2013/0256113 | A1 * | 10/2013 | Tumiatti | ................... C10B 1/10 201/19 |
| 2014/0069798 | A1 * | 3/2014 | Hayward | .............. B09B 3/0083 201/8 |

OTHER PUBLICATIONS

Guidelines for Post Consumer Recycled Content in Plastic Packaging; Greenblue, Aug. 24, 2014 (online) (retrieved on Feb. 21, 2017). Retrieved from the Internet URL: http://web.archive.org/web/*/http://www.sustainablepackaging.org/uploads/resources/spc_pcr_plastic_packaging.pdf; p. 2, col. 2; p. 8, col. 2 2014.

Mitchell, Carey, "Are There Real Differences Between Type 6 and 6,6 Nylons?", The Digest, downloaded May 13, 2016, 4 pages.

SWICOFil, "Polytrimethylene terephthalate PTT yarns—Corterra", 5 pages, last accessed on Jan. 18, 2016.

Pakpahan, Edward Nixon, International Conference on Emerging Technologies in Environmental Science and Engineering, "Effect of Temperature on the Formation and Degradation of Polycyclic Aromatic Hydrocarbons", pp. 569-575. Oct. 28, 2009.

Diaz et al. "Comprehensiver Process for the Recovery of Value and Critical Materials from Electronic Waste" Manuscript, 38 pages Mar. 22, 2016.

* cited by examiner

MULTISTAGE THERMOLYSIS METHOD FOR SAFE AND EFFICIENT CONVERSION OF CARPET/RUG, POLYMERIC MATERIALS AND OTHER WASTE SOURCES

CROSS-REFERENCE TO RELATED APPLICATIONS

This application is a Continuation Application of U.S. Ser. No. 15/168,413 filed May 31, 2016, which claims priority under 35 U.S.C. § 119 to provisional application Ser. Nos. 62/293,184 filed Feb. 9, 2016, titled Multistage Thermolysis Method for Safe and Efficient Conversion of Carpet/Rug and Polymeric Materials, and 62/273,751 filed Dec. 31, 2015 titled Multistage Thermolysis Method for Safe and Efficient Conversion of E-Waste materials, each of which are herein incorporated by reference in its entirety including, without limitation, the specification, claims, and abstract, as well as any figures, tables, or drawings thereof.

FIELD OF THE INVENTION

The invention relates to clean, safe and efficient methods, systems and processes for utilizing thermolysis methods to processes and convert various carpet, rug, polymeric materials and other waste sources, such as solid waste, tires, manure, auto shredder residue, glass and carbon fiber composite materials, municipal solid wastes, medical wastes, waste wood and the like into a Clean Fuel Gas and Char source. Thermolysis provides an advanced pyrolysis methodology for heating and converting carpet, rug and polymeric materials as disclosed herein. In an particular aspect, the invention processes carpet, rug and polymeric materials, such as, for example, selvage and post-consumer carpet and rug waste and other plastics, to effectively shred and/or grind the waste source, and then process using thermolysis methods to separate, neutralize and/or destroy halogens and other hazardous components to provide a Clean Fuel Gas and Char source.

BACKGROUND OF THE INVENTION

The global carpet and rug waste markets continues to increase as landfills are reaching their capacity for such waste sources. In the United States alone approximately 2 million tons of post-consumer carpet (PCC) is landfilled each year. This is in addition to carpet and rug selvage (or shreds and scraps) that is landfilled. Worldwide the amount of these materials landfilled each year may reach as high as 4 billion pounds each year. The carpet industry has a unique and emerging problem as various states are placing limitations on the ability to landfill PCC, such as in the states of California and Michigan. With limitations in place for landfilling carpet, including PCC, there is an increased emphasis on recycling of such waste sources. However, polyester carpet is difficult to economically recycle (and represents approximately 40% of the PCC landfilled each year). Other fibers commonly used in carpet and rug materials present additional difficulties in recycling the materials. Moreover, carpet and rug materials are made of combinations of fibers, some are treated with polymers to provide certain desirable characteristics and/or combined with adhesives and/or backings, all of which creates difficulties in the recycling efforts for the waste source. For example, recycling may require removal of the backing which requires additional energy (gas and electricity) to skive and process the carpet to enable recycling. When recycling presents difficulties and/or is not economically feasible both landfilling and incineration remain the primary options for disposal of the waste source. However, incineration is known to result in the generation and atmospheric release of toxic compounds and increases $CO_2$ emissions.

In addition to the carpet and rug waste sources generated by the carpet industry and consumers, there is an expansive additional waste source that includes "other" polymeric materials. Plastics are abundantly employed in all industries and by nearly all consumer groups, resulting in an increasing demand for safe and efficient recycling of these waste sources. However, due to the myriad consumer products employing plastics and polymeric materials, many products are made by combining such plastics and polymeric materials (along with other materials, such as metals) which result in its inability to be conventionally recycled.

Still further waste sources abound in need for efficient processing, recycling and/or disposal. This include for example, solid waste, tires, manure, auto shredder residue, glass and carbon fiber composite materials, municipal solid wastes, medical wastes, waste wood and the like.

As a result, there remains a need for efficient processing of a variety of carpet, rug and other polymeric material waste sources. Accordingly, it is an objective of the claimed invention to solve the long-standing problem and need in the art for efficient methods for processing of carpet, rug and other polymeric material waste sources.

A further object of the invention is to provide methods, systems, and/or processes for utilizing thermolysis methods to safely and efficiently convert such waste sources to a Clean Fuel Gas and Char source without the generation of (and beneficially the removal of) toxic byproducts, including small molecules, including those chlorinated polymers commonly used in these waste input streams. Toxic byproducts further include, for example, VOCs, aromatics and polycyclic aromatic hydrocarbons (PAHs), dioxins and furans, including halogenated dibenzodioxins and halogenated dibenzofurans, biphenyls, pyrenes, cadmium, lead, antimony, arsenic, beryllium, chlorofluorocarbons (CFCs), mercury, nickel and other organic compounds. As a result, the methods, systems, and/or processes of the invention meet even the most rigid environmental standards.

A further object of the invention is to provide methods, systems, and/or processes for utilizing thermolysis methods to safely and efficiently convert various waste sources to a Clean Fuel Gas and Char source. In particular, the generation of a Clean Fuel Gas provides a desirable waste-to-energy pathway from a previously unutilized waste source through the recycling of tars and oils to generate Clean Fuel Gas to thereby reuse the energy that went into the original fabrication. In a further application, the generation of the Char source is suitable for further recycling and/or use of the Char source for further separation of desirable components for various applications as disclosed pursuant to the invention.

A further object of the invention is to utilize thermolysis methods to destroy (and beneficially not generate any additional) toxic halogenated organic compounds present in certain components of the waste sources.

A further object of the invention is to utilize thermolysis methods to generate clean, useable fuel gas sources substantially-free or free of halogenated organic compounds (including VOCs).

Other objects, advantages and features of the present invention will become apparent from the following specification taken in conjunction with the accompanying drawings.

BRIEF SUMMARY OF THE INVENTION

An advantage of the invention is the clean and efficient methods, systems, and/or processes for Thermolysis methods to safely and efficiently convert carpet, rug and other polymeric material waste sources into clean energy, namely a Clean Fuel Gas and Char source. It is a further advantage of the present invention that the waste sources are converted by destroying toxic halogenated organic and hydrocarbon compounds present therein, and clean, useable fuel gas sources substantially-free or free of halogenated organic or hydrocarbon compounds are generated.

In an aspect, a method for converting a carpet, rug, other polymeric material and/or other waste sources to a Clean Fuel Gas and Char source comprise: (a) inputting a carpet, rug, other polymeric material and/or other waste source into a thermolysis system; (b) optionally increasing the moisture content of the waste source by injecting steam into the system; (c) undergoing a depolymerization and a cracking reaction of hydrocarbons in the a carpet, rug and/or other polymeric material waste source; (d) destroying and/or removing toxic compounds present in the carpet, rug and/or other polymeric material waste source; and (e) generating the Clean Fuel Gas and Char source, wherein the Clean Fuel Gas source is used for power to a system or application; wherein the Char source can be recycled and/or contains recoverable metals; and wherein the Clean Fuel Gas and Char source are substantially-free of halogenated organic compounds.

In an aspect, a method for converting a carpet, rug, other polymeric material and/or other waste source to a Clean Fuel Gas and Char source comprises: (a) shredding or grinding a carpet, rug, other polymeric material and/or other waste source to provide a substantially uniform waste source into a thermolysis system providing indirect heat in a system that is free of oxygen; (b) optionally increasing the moisture content of the waste source to about 5-20% by injecting steam into the system or by drying a waste source to a moisture content of about 5-20%; (c) undergoing a depolymerisation and a cracking of hydrocarbons in the waste source; (d) destroying and/or removing toxic compounds present in the waste source; (e) generating a Char, wherein the Char comprises carbon and fillers and is suitable for further recycling; (f) generating a Clean Fuel Gas source from the pyrolytic conversion of hydrocarbons in the waste source, wherein the fuel gas source is free of halogenated organic compounds, and wherein from about 3,000 to 20,000 BTUs per pound of the waste source is generated as the fuel source; and (g) providing at least a portion of the fuel gas source to the method for converting the waste sources to provide an energy source for such method.

In an further aspect, the waste source comprises carpet and/or rug selvage, post consumer waste and combinations thereof. In a further aspect, the waste source is selected from the group consisting of nylon, polypropylene (olefin), polytrimethylene terephthalate (PTT), polyester (PET), acrylic (or acetates), wool, other synthetic fibers, carpet adding, carpet fillers carpet backing materials, and combinations thereof. In a further aspect, the waste source comprises non-carpet and/or rug polymeric materials. In a further aspect, the polymeric materials is selected from the group consisting of polyethylene terephthalate (PETE or PET), high-density polyethylene (HDPE), polyvinyl chloride (PVC), low-density polyethylene (LDPE), polypropylene (PP), polystyrene (PS), Polycarbonate (PC), polylactide and combinations thereof. In a further aspect, the other waste source is a solid waste. In a further aspect, the other waste source are tires. In a further aspect, the other waste source is manure and/or other solid waste. In a further aspect, the other waste source is auto shredder residue. In a further aspect, the other waste source are composite materials. In a further aspect, the other waste source is a municipal solid waste, medical waste and/or waste wood.

In an aspect, the methods for converting a carpet, rug, other polymeric material and/or other waste sources to a Clean Fuel Gas and Char source are performed in a thermolysis system comprising at least one reactor with a process temperature of from about 300° C. to about 800° C., or from about 400° C. to about 800° C. for the waste source to undergo at least partial gasification. In a further aspect, the thermolysis system provides indirect heat in a system that is free of oxygen, and wherein the thermolysis system has a pressure range from about 10 to about 100 millibar. In a still further aspect, the moisture content of the waste source is measured or the pressure in the reactor is measured to determine the amount of steam to be injected into the reactor to increase the moisture content or drying of the waste source to decrease the moisture content to between about 5-20%. In a further aspect, an initial step of shredding or grinding the waste source is conducted to provide the waste source as a substantially uniform size having an average diameter of less than 1 inch.

In an aspect, the methods for converting a carpet, rug, other polymeric material and/or other waste sources to a Clean Fuel Gas and Char source are performed such that the toxic compounds destroyed and/or removed comprise aromatics and polycyclic aromatic hydrocarbons, halogenated dibenzodioxins, halogenated dibenzofurans, biphenyls, pyrenes, cadmium, lead, antimony, arsenic, beryllium, chlorofluorocarbons, mercury, nickel and other organic compounds present in the waste source. In a further aspect, the methods do not generate any toxic halogenated organic compounds in the process of converting the waste sources to the Char and fuel gas.

In an aspect, the methods for converting a carpet, rug, other polymeric material and/or other waste sources to a Clean Fuel Gas and Char source, wherein the Char comprises carbon and fillers, and wherein the Char is suitable for further recycling and/or an additional step of removing fillers from the carbon for further reuse of the carbon and/or fillers. In a further aspect, the Clean Fuel Gas source further comprises the separation of oil-soluble substances from a gas/vapor mixture following the thermolytic conversion of hydrocarbons in the waste source. In an aspect, the gas fuel is scrubbed and vapor components undergo fractionated condensation. In a further aspect, the Char and the fuel gas source are free of halogenated organic compounds. In a further aspect, at least a portion of the fuel gas source generated is provided back to the method for converting the waste sources to provide an energy source for such method and/or provided as a fuel source for an alternative application of use, and wherein from about 3,000 to 20,000 BTUs per pound of the waste source is generated as a fuel source.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The patent or application file contains at least one drawing or photograph executed in color. Copies of this patent or patent application publication with color drawing(s) will be provided by the Office upon request and payment of the necessary fee.

Figure 1:
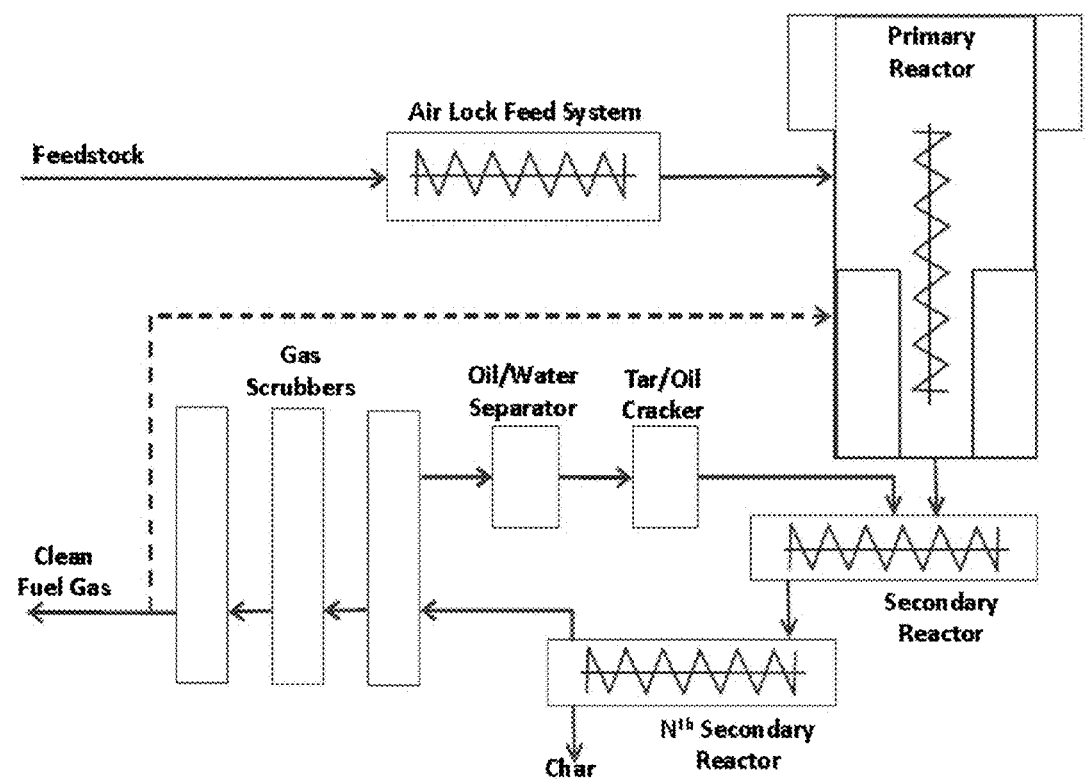
FIG. 1 shows a process diagram for the methods, systems, and/or processes of the present invention.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The embodiments of this invention are not limited to particular methods, systems, and/or processes for thermolysis methods to safely and efficiently convert various carpet, rug and other polymeric material waste sources, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers defining the range and include each integer within the defined range.

Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The terms "carpet" and "rug" are often used interchangeably. A skilled artisan understands that fiber make-up of carpet and rugs are often interchangeable; however the definition is based upon a rug generally referring to a textile floor covering that is not fastened down and that does not extend over the entire floor, where as carpet generally refers to a floor covering that is installed and fastened down, such as from wall to wall. As referred to herein for the methods, systems, and/or processes of the present invention, carpet and rug describe a waste input generally comprising a fiber, padding, fillers and/or backing materials.

The term "substantially-free," as used herein may refer to a minimal amount of a non-desirable and/or toxic component in a material, such as a Char generated by the methods, processes and systems of the invention. In an aspect, a material is substantially-free of a defined component if it contains less than a detectable amount of the defined component, or less than about 10 parts per billion (ppb), or more preferably less than about 1 ppb. In an embodiment, Char and fuel gas generated according to the processing of the waste is substantially-free of toxins, including halogens, having less than about the detection limit of about 10 ppb, or more preferably less than about 1 ppb of the toxin, including halogens. For toxic and/or hazardous materials, free represents an amount below the detection limit of the appropriate material within experimental error. In an aspect of the invention the Char and Fuel Gas Source generated according to the processing of carpet, rug and other polymeric material waste sources free of toxins, indicating that there is a non-detectable amount of toxins in the measured source.

The term "substantially-free," as used herein referring to oxygen in the thermolysis methods refers to a minimal amount of oxygen or air. In an aspect, a system is substantially-free of oxygen if it contains less than about 4 wt-%, and preferably less than about 2 wt-%.

The term "thermolysis" as used herein is generally referred to as a thermal-chemical decomposition conversion process employing heat to an input source in need of conversion to a Clean Fuel Gas and Char source. Thermolysis refers generally to thermal-chemical decomposition of organic materials at temperatures >300° C. and in some instances in the absence of external oxygen to form gases, tars, and oils and Chars that can be used as chemical feedstocks or fuels. Tars and oils represent groups of volatile organic compounds, viscous liquids, paraffins, waxes, aromatics, aliphatics, fats and other petrochemical based organic mixtures for example. The thermolysis methods disclosed according to the present invention are an advancement over conventional pyrolysis and/or thermolysis methods, which employ fire or a heat source and include an oil as an output. As described herein according to the invention no oil is generated as an output of the thermolysis methods of the present invention. As disclosed in further detail herein, the present thermolysis methods employ at least a reprocessing of any tars and oils. Based on at least these distinctions between the thermal conversion methods, the terms thermolysis and pyrolysis are not synonymous, as thermolysis provides various beneficial improvements not previously achieved by pyrolysis methods and/or conventional thermolysis methods.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods, systems, and/or compositions of the present invention may comprise, consist essentially of, or consist of the components and ingredients of the present invention as well as other ingredients described herein. As used herein, "consisting essentially of" means that the methods, systems, and/or compositions may include additional steps, components or ingredients, but only if the additional steps, components or ingredients do not materially alter the basic and novel characteristics of the claimed methods, processes and/or systems.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

The methods, systems, and/or processes of the present invention relate to thermolysis methods to safely and efficiently convert various carpet, rug and other polymeric material waste sources to a Clean Fuel Gas and Char source. Beneficially, the methods, systems, and/or processes of the present invention provide significant and unexpected advances beyond conventional thermolysis methods. For example, conventional combustion processes which burn carpet, rug and other polymeric material waste sources are highly unpredictable and difficult to control. Although advancements in thermolysis have been made in the prior art, the present invention beneficially exceeds the capabilities of known thermolysis methods in converting carpet, rug and other polymeric material waste sources into valuable outputs which beneficially destroy (and do not generate any new) toxic halogenated organic compounds present in certain carpet, rug and other polymeric material waste sources. Moreover, the thermolysis methods of the invention include the use of multiple reactors, reinjection and cracking of any and all tars and oils that are created. As a further benefit, the methods, systems, and/or processes of the present invention generate clean, useable fuel gas sources substantially-free or free of halogenated organic compounds. Notably, the methods, systems, and/or processes of the present invention do not simply reduce the amounts of halogenated compounds and other toxins that may be found in certain carpet, rug and other polymeric material waste sources, instead these are removed (with no additional generation) from the treated waste sources while further providing the useful and valuable outputs of the invention (e.g. fuel gas source) defined further herein.

Carpet, Rug, Other Polymeric Materials and Other Waste Sources

The methods, systems, and/or processes of the present invention relate to novel processes using thermolysis methods to safely and efficiently convert various carpet, rug, other polymeric material and other waste sources, such as solid waste, tires, manure, auto shredder residue, glass and carbon fiber composite materials, municipal solid wastes, medical wastes, waste wood and the like, into Fuel Gas Source and Char. As referred to herein, the "waste sources" include, but are not limited to: (i) carpet and rugs, including both selvage and post-consumer waste, including the fiber, padding, fillers and/or backing material components of carpets and rugs, (ii) other polymeric materials, (iii) and other waste sources, such as solid waste, tires, manure, auto shredder residue, glass and carbon fiber composite materials, municipal solid wastes, medical wastes, waste wood and the like.

As one skilled in the art will ascertain, waste sources according to the invention differ based upon factors including its pre- or post-consumer nature of the waste source, fiber and polymer types, including whether polymers and/or adhesive backings are employed in the waste source. As one skilled in the art ascertains, there are significant differences among polymeric materials employed in waste sources requiring processing according to this invention. The methods, systems, and/or processes of the present invention unexpectedly provide suitable conditions for the conversion of such diverse carpet, rug and other polymeric material waste sources into desirable outputs described herein. However, the nature of the particular waste source will impact that particular thermolysis methods, systems, and/or processes of the present invention to convert such carpet, rug and other polymeric material waste sources into a Clean Fuel Gas and Char source.

Without being limited to a particular theory of the invention, polymer additives, synthetic fibers and/or adhesive backings are often formulated for carpet and rugs (such as those used in certain vinyl carpet and rug backings). Beneficially, the Thermolysis method is suited for processing myriad types of such carpet, rug, other polymeric materials and other waste sources without modifications to the processing methods, systems and/or apparatuses disclosed herein.

Carpet and Rug Materials

In an aspect of the invention, carpet and rugs include various types of fibers and materials, each of which (and combinations thereof) are a suitable waste source for use according to the methods, systems, and/or processes of the present invention. Carpet and rugs refer inclusively to all types of fibers used to create carpet and rugs, including for example, thread-like fibers (of any material), which may be converted into a yarn and tufted and/or woven into the carpet and/or rug. Carpet and rug materials include both natural and synthetic fibers and materials, such as polymers and thermoplastics that can be spun into both fibers and yarns. Carpet and rug also refers inclusively herein to any padding, fillers and/or backing material components that may be combined with the carpet for processing herein.

The carpet and rug materials disclosed herein may further include various contaminants as a result of the post-consumer nature, such as PCC, which a skilled artisan will ascertain to include various contaminants not found in selvage. For example PCC is generally understood to include dirty or soiled carpet and rug materials. As referred to herein "soils" are intended to include any types of soil (e.g. grease, oils, organic substances).

Fibers

Exemplary carpet and rug fiber materials include for example, nylon, aromatic polyesters, including polytrimethylene terephthalate (PTT), polyethylene terephthalate (PET) and polybutylene terephthalate (PBT), polypropylene, wool, acrylic (plastic fiber made from acrylonitrile units, frequently used in fake fur upholstery fabrics), cotton, natural fibers including those made from organic sources that have not been chemically altered (e.g. jute, wool, cotton, silk, sea grass, and hemp), silk, along with various materials for adhesives and backings to accompany carpets and rugs, including latex and other adhesives, urethane foam, natural and synthetic rubbers, including styrene-butadient rubber (SBR), and blends thereof.

The most common fibers employed for carpets and rugs include nylon, polypropylene (olefin), PTT (also referred to as Triexta polyester), polyester (PET), acrylic (or acetates), and wool. An estimated 90% of carpets are now made from the synthetic fibers comprised of one of the following: nylon, polypropylene or polyester. For carpet and rug applications, nylon is the most versatile of all fibers, providing excellent durability and flexibility in creating a variety of carpet styles and is therefore the most commonly used carpet fiber. It is estimated that nylon is used in over half of all carpet and rugs. Nylon can be acid dyed or solution dyed. A limitation of nylon is that it is melted by very strong acids such as hydrochloric acid, is easily stained by acid dyes (the dyes in most foods and drinks), and is bleached out by chlorine bleach. Nylon comes in two forms: Type 6,6 and Type 6.

Polyester are not as inherently strong and durable as nylon; however they are commonly used in carpet and rug materials due to its softness and color clarity providing a natural stain and fade resistant fiber. Polyester (PET) is no longer gaining market share despite being soft to the touch. Like olefin, it has very poor resilience, which obviates its use in high traffic areas and it readily attracts oily soils.

Polypropylene is also commonly used for its properties of not absorbing water, and most often used in loop pile construction in which there is less need for resiliency because it is not as strong as other fibers. Polypropylene (olefin), a by-product of gasoline refining, continues to gain market share due to its lower cost compared to nylon and its stain resistance due to a lack of dye sites and the fact that it is chemically inert. Olefin is used in most Berber carpets or for use where a less expensive product is required and life expectancy and long-term appearance are unimportant. Olefin is the fiber of choice to use for outdoor carpet and rugs.

PTT is a synthetic polyester fiber (extensively used in the carpet industry under the tradename Corterra). These fibers are commonly used as they provide resiliency and stain resistance. Corterra was originally made by Shell Chemical and was touted at one time as the eventual replacement for nylon as the primary fiber of choice in carpet, but that has not happened.

Padding, Fillers and/or Backing Materials

As referred to herein, padding, fillers and/or backing material components of carpets and rugs generally refer to the non-fiber components of the carpet construction. Padding, fillers and/or backing materials may include the backing, such as latex adhesives used to hold backings together, fillers and/or treatments for stain resistance and/or other desirable qualities. Further description of the process and the make-up of such material components is provided for example by the World Floor Covering Association, titled "How Carpet is Made" (2013), which is herein incorporated by reference in its entirety. In an aspect, a majority of carpet and rug materials are comprised of at least about 40% backing, wherein such backing can comprise from about 20% latex and about 80% fillers (although the make-up of such materials is not intended to limit any embodiments of the invention and/or components for processing according to the invention).

Backings is understood to refer to fabric that makes up the back of a carpet, as opposed to the carpet pile (or face). A carpet backing provides a base cloth to hold the yarn/fiber in place while tufting of the carpet or rug occurs. One or more backings may be included, such as a primary and secondary backing, and may comprise a web or weave of backing materials. In an aspect, a secondary backing is a material laminated to the primary backing to provide dimensional stability.

Exemplary backing material components of carpets and rugs include for example, polypropylene, polyethylene, vinyl, foam rubber, urethane and polyurethane, polyvinyl chloride (PVC), which is a conventional vinyl composite flooring, jute and the like. The exemplary backing material components may also include the adhesive to combine the backings, such as for example latex, such as styrene-butadiene synthetic rubber (SBR) or other synthetic latex or other adhesives. In some aspects for backings, foam rubber is a preferred secondary backing. In other aspects for backings, urethane backings are preferred over foam rubber to provide a stronger hold of the fibers and bond of the fiber to the primary backing.

Exemplary padding (also referred to as cushioning) material components of carpets and rugs include for example, urethane, rubber and sponge rubbers, and the like.

Exemplary filler material components of carpets and rugs include for example, latex, carbonates and other mineral fillers including calcium carbonate, polyurethane, PVC, polyethylene and EVA. Additional fillers are disclosed for example, in U.S. Patent Publication No. 2009/0017253, which is incorporated herein by reference in its entirety.

In an aspect, the padding, fillers and/or backing material components of carpets and rugs may introduce various hazardous components, such as halogens or halogenated compounds into the carpet and rug materials. As described herein, such compounds can be introduced as a result of surface treatments to the carpet and rug materials, and/or they can be built into the backing, fillers and/or cushioning of the carpet and rug materials, such as to provide fire retardancy. In each aspect of the invention, such padding, fillers and/or backing material components, including those introducing potentially hazardous components such as halogenated compounds, are a suitable waste source for use according to the methods, systems, and/or processes of the present invention.

As referred to herein, flame and/or fire retardant polymers may be contained in padding, fillers and/or backing material components of carpets and rugs and refer to an additive halogenated molecule (such as bromine or chlorine) chemically designed to blend with the other materials, coat materials, or the like. In an aspect, exemplary fire retardant compounds used in certain carpet and rug materials includes a combination of PVC and fillers, such as aluminum trihydrate, which releases chlorine (such as evidenced in the assay results in the Examples showing elevated chlorine levels of certain waste sources processed according to the invention).

In an aspect of the invention, and without being limited to a particular mechanism of action, such flame and/or fire retardant molecules migrate within the polymer matrix during thermal exposure or flame and/or fire combustion. In some aspects, flame and/or fire retardant molecules may be compounded with antimony trioxide ($Sb_2O_3$) as a powerful synergist resulting in antimony tribromide ($SbBr_3$) designed to smother a flame and/or fire and form insulating Char on the surface. Overall, such flame and/or fire retardant polymers have a plasticizing effect which are known to dilute the physical properties of the polymer instead of improve. Flame and/or fire retardant (FR) molecules can be added to carpet and/or rug materials along with other additives, colorants, stabilizers and reinforcements. Exemplary polymers include: PVC latex, PVC binders, FR-polypropylene, FR-SBR Latex, ethylene, propylene and the ethylene-propylene co-polymer blends (hot melt binders), and flexible polyurethane compositions used as elastomeric backing. In an aspect, regardless of the source of flame and/or fire retardant polymers, or other hazardous compounds in the carpet and/or rug materials (or other polymeric materials), the invention beneficially recovers the energy in the waste source and returns it as a reusable energy source, and further safely decomposes any hazardous flame and/or fire retardants without the production of any toxic components (such as dioxins and furans). These and other benefits of processing the described waste sources according to the invention are disclosed here.

Other Polymeric Materials

In an aspect of the invention, plastics are a suitable polymeric waste source for use according to the methods, systems, and/or processes of the present invention. Plastic is an abundant component of numerous consumer products. The Society of the Plastics Industry (SPI) established a classification system for plastics which is based upon each type of plastic's chemical makeup. This coding system (SPI code) is commonly found on plastic products in the United States, usually molded into the bottom. The SPI code provides an outline of various types of plastics which are suited for treatment according to the invention.

Plastic marked with an SPI code of 1 is made with polyethylene terephthalate (PETE or PET). PET plastic is used to make many common household items like beverage bottles, medicine and/or food jars, etc. as well as use for carpet, fiberfill material in winter clothing, and more. PET plastic (alone and in combination with other carpet, rug and polymeric materials) is a suitable waste source for processing according to the methods, systems, and/or processes of the present invention.

Plastic marked with an SPI code of 2 is made with high-density polyethylene, or HDPE. Items made from this plastic include containers for milk, motor oil, shampoos and conditioners, soap bottles, detergents, and bleaches. Many personalized toys are made from this plastic as well. HDPE plastic (alone and in combination with other carpet, rug and polymeric materials) is a suitable waste source for processing according to the methods, systems, and/or processes of the present invention.

Plastic marked with an SPI code of 3 is made with polyvinyl chloride, or PVC. PVC is used for all kinds of pipes and tiles, but its most commonly found in plumbing pipes. PVC plastic (alone and in combination with other carpet, rug and polymeric materials) is a suitable waste source for processing according to the methods, systems, and/or processes of the present invention.

Plastic marked with an SPI code of 4 is made with low-density polyethylene, or LDPE. LDPE is both durable and flexible and often used for plastic cling wrap, sandwich bags, squeezable bottles, and plastic grocery bags. LDPE (alone and in combination with other carpet, rug and polymeric materials) is a suitable waste source for processing according to the methods, systems, and/or processes of the present invention.

Plastic marked with the SPI code of 5 is made with polypropylene (PP), which is strong and can usually withstand higher temperatures. Among many other products, it is used to make plastic diapers, Tupperware, margarine containers, yogurt boxes, syrup bottles, prescription bottles, and some stadium cups. PP (alone and in combination with other carpet, rug and polymeric materials) is a suitable waste source for processing according to the methods, systems, and/or processes of the present invention.

Plastic marked with an SPI code of 6 is made with polystyrene (PS) and most commonly known as Styrofoam. PS can be recycled, but not efficiently; recycling it takes a lot of energy. Disposable coffee cups, plastic food boxes, plastic cutlery, packing foam, and packing peanuts are made from PS. PS (alone and in combination with other carpet, rug and polymeric materials) is a suitable waste source for processing according to the methods, systems, and/or processes of the present invention.

The SPI code of 7 is used to designate miscellaneous types of plastic that are not defined by the other six codes. Polycarbonate and polylactide are included in this category. Polycarbonate, or PC, is used in baby bottles, large water bottles (multiple-gallon capacity), compact discs, and medical storage containers. Recycled plastics in this category are used to make plastic lumber, among other products. Polycarbonate, polylactide and other polymeric materials not included in the other six codes (alone and in combination with other carpet, rug and polymeric materials) is a suitable waste source for processing according to the methods, systems, and/or processes of the present invention.

Other Waste Sources

In an aspect of the invention various other waste sources are a suitable waste source for use according to the methods, systems, and/or processes of the present invention. These include for example, solid waste, tires, manure, auto shredder residue, glass and carbon fiber composite materials, municipal solid wastes, medical wastes, waste wood and the like.

Solid Waste Materials

In an aspect of the invention, solid waste materials are a suitable waste source for use according to the methods, systems, and/or processes of the present invention. Solids waste can be from a variety of sources, including for example, municipal solid wastes, wood waste, hospital and other medical waste.

Tires

In an aspect of the invention, tires are a suitable waste source for use according to the methods, systems, and/or processes of the present invention. Tire waste sources are particularly well suited for processing according to the invention due to the rubber composition of tires which are manufactured to include halogens, namely halogenated dioxins (brominated dioxins, including halobutyl rubber (both bromine and chlorine such as bromobutyl rubber) and furans. In an aspect, the metal reinforcements in the tires are recovered intact and the clean fuel gas produced can be used for industrial process control or to generate electricity. The present methods provide an improved processing over conventional incineration of tires, which for example the processing tires having an exemplary 1.8-2.0% bromine in the tire construction and processed at about 250 tons per day would generate about 4-5 tons of bromine in the form of HBr, the condensation of which could form large amounts of 48% HBr causing undesirable outcomes (e.g. destroying tanks, valves, controls, filters, piping and steel buildings along with safety concerns).

Composite Materials

In an aspect of the invention, composite materials are a suitable waste source for use according to the methods, systems, and/or processes of the present invention. Composite includes glass and carbon fiber composite materials.

Manure

In an aspect of the invention, manure materials are a suitable waste source for use according to the methods, systems, and/or processes of the present invention. Manure comprises a variety of organic components and there are large quantities of the manure, such as pig poop, which are desired to be removed from hog confinements, farms and the like.

Auto Shredder Residue

In an aspect of the invention, auto shredder residue waste materials are a suitable waste source for use according to the methods, systems, and/or processes of the present invention. Auto shredder residue is commonly referred to as the output from the shredding of automobiles, household appliances and the like through a hammer mill process for grinding the materials which results in a mixture of ferrous metal, non-ferrous metal (e.g. alloys of copper and aluminum) and shredder waste. This resulting automotive shredder residue or automobile shredder residue is commonly referred to as ASR.

In an aspect, the process of ASR waste materials according to the invention particularly benefits from the thermolysis methods as a result of the ability to remove any mercury-containing compounds from the processed waste through the "wet scrubbing" step to remove mercury having formed a mercury halide, which may an insoluble halogen salt in water which is removed in the scrubber. In an aspect, the mercury halide is scrubbed out in the scrubber and thereafter disposed. In an aspect, the gas is introduced as a gas flow into a wet scrubber for purification. In an aspect, the gas scrubber(s) separate tars, oils and Char from the product gas flow. In a further aspect, the gas scrubber(s) can further cool the product gas, for example to a temperature below about 80° C. The scrubber(s) may further be employed for a final removal step for any toxic compounds in the fuel gas product.

Combinations of Waste Sources

In an aspect of the invention, a combination of any of the aforementioned carpet, rug, other polymeric materials and other waste sources, such as solid waste, tires, manure, auto shredder residue, glass and carbon fiber composite materials, municipal solid wastes, medical wastes, waste wood and the like, may be processed in a combined processing according to embodiments of the invention.

Thermolysis Methods

The methods, systems, and/or processes of the present invention relate to thermolysis methods to safely and efficiently convert various carpet, rug, polymeric waste sources and other waste sources to gas/vapor mixtures and carbonaceous materials, namely a Clean Fuel Gas source and a Char source. The gas source is suitable for use in powering a facility as an energy source, and the char source is suitable at least for further recycling. In an aspect, the gas/vapor including halogens are cleaned and removed as disposable salts. In a further aspect, any mercury is vaporized in the reactors of the system. The metals are recovered substantially in their original form and most have not been melted. As a result of the methods described herein, a clean Char source and fueled gas are the only products of the system.

As referred to herein the thermolysis methods employ a continuous, oxygen-free thermal process of carpet, rug, and other polymeric material and other waste sources using heat energy. Beneficially, the methods, systems, and/or processes of the present invention convert the carpet, rug, polymeric waste sources and other waste sources by destroying and not generating additional toxic halogenated organic compounds present in some of the waste sources. As a further benefit, the methods, systems, and/or processes of the present invention generate clean, useable fuel gas sources substantially-free or free of halogenated organic compounds. As a still further benefit, the methods, systems, and/or processes of the present invention generate a Char which can be further recycled for sustainability purposes and which is notably substantially-free or free of halogenated organic compounds.

As a still further benefit, the invention providing for the generation of a Clean Fuel Gas and Char without the formation of (along with the destruction of) halogenated compounds beneficially prolongs the life span of the systems employed for the thermolysis methods. Without being limited according to a particular mechanism, the reduction of formation of halogenated compounds, such as hydrogen bromide which is known to form hydrobromic acid in solution with water, reduces the corrosive damage caused to the systems, such as valves, filters, reactors and the like.

In an aspect the systems and apparatuses utilized for the methods and processes of the present invention includes at least the following components as substantially depicted in FIG. 1, including: a feedstock input, airlock, at least one reactor (and preferably a series of reactors), gas scrubbers, tar/oil crackers (or may be referred to as cracking reactor), collection tanks for Char, and output for Clean Fuel Gas. Additional optional components may include for example, pipes for addition of steam generated via heat exchange for injection into the reactor(s), a carbon removal unit for removal of carbon from the Char. Modifications to these systems and apparatuses, including as described herein, are considered within the level of ordinary skill in the art based upon the description of the invention set forth herein.

In an aspect the methods, systems, and/or processes of the present invention include the steps as substantially depicted in FIG. 1, including the following processing steps: shredding, chopping and/or grinding of the carpet, rug, other polymeric waste and other other waste source inputs; a reaction or series of thermolysis reactions in a substantially oxygen-free continuous, low pressure thermolysis process with indirect heating; employing more than one reactor for the thermolysis reactions; separation of Char; a tar and oil reprocessing or cracking step; and scrubbing of the fuel gas.

The methods, systems, and/or processes of the present invention may optionally include one or more of the following steps: separation of carpet, rug, polymeric waste sources and other waste sources; drying the waste input, separating any components from the carpet, rug, polymeric waste source and other waste sources (e.g. as is customarily done in a carpet recycling or reprocessing for use of the carpet fibers); separation step; increasing a moisture content of the waste input (e.g. via steam injection into the reactor to enhance gasification); employing additional gas scrubbers; collection and separation of components from the Char (e.g. carbon and/or fillers, such as calcium carbonate).

The methods, systems, and/or processes of the present invention can be carried out in a variety of apparatus for thermolysis. An exemplary device or series of reactors, further including oil and other separators, char/oil separators, gas scrubbers, evaporators, and the like are shown for example in U.S. Patent Publication No. 2014/0182194, which is incorporated herein by reference in its entirety.

In an aspect the invention includes an initial optional step of separating components and/or types of the carpet, rug, polymeric waste sources and other waste sources for processing according to the invention. In an aspect, one or more types of the carpet, rug, polymeric waste sources and other waste sources may be separated for independent processing according to the methods of the invention. For example, carpet and rug materials may be separated from consumer polymeric materials for separate processing thereafter. However, beneficially according to the invention, such separation of the carpet, rug, polymeric waste sources and other waste sources does not require using separate reactor systems. Instead, it is a benefit of the invention that the carpet, rug, polymeric waste sources and other waste sources may be processed using the same reactor systems in either the same or in different batches.

In an aspect, the invention includes an initial optional step of separating components of the carpet and rug waste sources prior to a shredding and/or grinding phase. In an aspect, conventional separation methods for removing the face fiber from any carpet and/or rug from the padding, fillers and/or backing material may be employed. In an aspect, certain states or other jurisdictions having mandates to recycle and/or reuse certain percentages of carpet fibers may first employ a step to separate face fibers for further recycling (i.e. cleaning, extruding, pelletizing and/or reextruding the fibers) and/or reuse separate from the methods of the invention. In such an aspect, the remainder of the carpet and/or rug materials are processed as a waste input source according to the invention, including for example, the padding (e.g. urethane pads) and other backing and/or filling materials. In an alternative aspect, such separation methods are no longer required for the recycling of the carpet and/or rug materials, as the entirety of the components are suitable for processing according to the invention and can enter the initial shredding step as a single waste input.

In an aspect, the invention includes an initial shredding, chopping and/or grinding step of the carpet, rug, polymeric waste sources and other waste sources, each of which may be referred to herein as shredding and/or grinding. The scope of the invention is not limited with respect to this initial processing step to reduce the size of the input waste source and provide a substantially uniform input source. In an aspect, the carpet, rug, polymeric waste sources and other waste sources can be placed directly into a grinder or shredder. In an aspect, the grinding and/or shredding step provides substantially uniform pieces of the input source. In an aspect, the grinding and/or shredding step provides pieces of the input source having an average diameter of less than about 2 inches, preferably less than about 1 inch, or in some aspects, to less than about 0.5 inches. In an aspect, the shredding and/or grinding can include a first coarse step followed by a fine shredding and/or grinding step. In an alternative aspect, the shredding and/or grinding can include a single processing step.

Various shredding and/or grinding techniques may be employed according to the invention to provide the waste input source in a desirable size or form for processing. In a preferred aspect, the carpet, rug, polymeric waste sources and other waste sources are ground and/or shredded to a size of less than about 1 inch to provide a substantially uniform input source. In a further preferred aspect, the substantially uniform input source is combined with any dust or other debris from the shredding and/or grinding step that is recovered for processing according to the methods of the invention.

Beneficially, according to the invention a variety of carpet, rug, polymeric waste sources and other waste sources can be processed according to the invention without substantial extraction steps to remove or separate various components for distinct and separate processing. This is a significant benefit over processing systems and techniques of the prior art requiring substantial sorting and separation of components. This is a known limitation of recycling efforts, that a great deal of manual and/or mechanical energy is required to sort and separate materials to be recycled, in particular when collection and post-consumer products are often commingled combinations of waste sources. The present invention does not require such extensive separation into similar types of materials for the processing of carpet, rug, polymeric waste sources and other waste sources.

In an aspect, the invention involves a reaction or series of thermolysis methods and reactions in a substantially oxygen-free continuous, low pressure, thermolysis process using heat energy. In an aspect, low pressure includes from about 10 to about 100 millibar, or any range therein. In an aspect, the invention involves an oxygen-free continuous, low pressure, thermolysis process in a reactor or series of reactors. As referred to herein, the oxygen-free process in the reactor(s) does not include air or oxygen in contact with the waste input source. Beneficially, as a result of the reduction and/or elimination of oxygen from the methods, systems, and/or processes of the present invention, the waste input sources are not exposed to flame and/or fires or plasma source and therefore do not form polycyclic aromatic hydrocarbons (PAHs), halogenated dibenzodioxins, halogenated dibenzofurans, biphenyls, and/or pyrenes, or other halogenated organics. In an aspect, the total aggregate composition of the waste sources comprising up to 10% halogen content are processed according to the methods, systems, and/or processes of the present invention without the creation of PAHs, halogenated dibenzodioxins, halogenated dibenzofurans, biphenyls, and/or pyrenes.

In a further aspect, the invention further includes the destruction of toxins, namely halogen compounds in addition to not generating any toxins as mentioned above. In an aspect, the methods destroy aliphatics, aromatics, and polycyclic aromatic hydrocarbons, halogenated dibenzodioxins, halogenated dibenzofurans, biphenyls, pyrenes, chlorofluorocarbons, etc.

In an aspect, the invention employs the substantially oxygen-free or oxygen-free continuous, low pressure thermolysis process with supply of heat energy. Thermolysis methods are known to employ different methods and amounts of heat energy, including for example: Low temperature thermolysis with a process temperature below 500° C.; medium-temperature thermolysis in the temperature range 500 to 800° C.; and melting thermolysis at temperatures of 800 to 1,500° C. According to aspects of the present invention, the substantially oxygen-free or oxygen-free continuous, low pressure thermolysis process applies indirect heating. In an aspect, the heating includes processing the waste source input at temperatures of about 400° C. to 800° C., preferably from about 400° C. to 600° C. Beneficially, the use of a lower temperature thermolysis process places less stress on a reactor(s) (such as steel reactors), requires less energy to run the continuous process according to the invention, and further maintains metals in contact with the system at lower temperature ranges which improves longevity, processing, etc. within a plant facility.

In an aspect, a reactor or series of reactors (also referred to as cascading reactors) allows for the thermolysis processing over the lower range of temperatures from about 400° C. to about 800° C., preferably from about 400° C. to 600° C. As one skilled in the art understands, there is not a single processing temperature for an input source according to the invention; instead a range of temperatures within a reactor (or series of reactors) is obtained. For example, within a single reactor the input source within the head of the reactor may be at a higher temperature than the bottom of the reactor. In addition, as one skilled in the art understands, the use of a single reactor may necessitate a higher temperature range, such as from about 600° C. to about 800° C., where a series of reactors enables a lower range of temperatures, such as from about 400° C. to about 600° C. In preferred aspects, the reactor(s) employed according to the methods of the invention do not require design for withstanding high temperature/pressure, as the relatively low temperature and pressures are employed (such as on average about 650° C. and ambient pressures of on average about 50 mbar).

The continuous thermolysis process is carried out in at least one reactor to undergo at least partial gasification. Various reactors known in the art can be employed, including for example, rotary drum reactors, shaft reactors, horizontal reactors, entrained-flow gasifiers, fixed-bed gasifiers, entrained-flow gasifiers, or the like. Exemplary reactors are disclosed, for example in, U.S. Publication No. 2014/0182194 and DE 100 47 787, DE 100 33 453, DE 100 65 921, DE 200 01 920 and DE 100 18 201, which are herein incorporated by reference in its entirety. As one skilled in the art will ascertain the number, sequence and scale of the reactors employed according to the invention can be adapted pursuant to the scale and volume of carpet, rug, polymeric waste sources and other waste sources inputted, which are embodied within the scope of the invention.

In some embodiments, a primary reactor employed according to the invention may comprise, consist of or consist essentially of input region with distributor, reactor mixing chamber, high-temperature region, high-temperature chamber, heating jacket chamber with burners, conversion section, inner register, and/or h eat transfer register. In exemplary embodiments, a secondary (or tertiary) reactor employed according to the invention may comprise, consist of or consist essentially of gas compartment with dome, high-temperature chamber with vertical conveying device, inner register and outer register, conversion section with conveyor device, heating jacket chamber and/or combustion chamber.

In an aspect, the reactor(s) are jacket-heated. In an aspect, the reactors are vertically and/or horizontally disposed. In an aspect, at least two reactors are employed. In an aspect, at least three reactors are employed. In an aspect, the reactor(s) may optionally undergo agitation. In a preferred aspect, at least one reactor or a primary reactor is vertical with a moving bed design and counter-current flow for the fuel gas along the heated walls into secondary reactors. Without being limited according to an embodiment of the invention, such designs minimize the creation of undesirable tars and fuel oils. In a further preferred embodiment, a moving bed design is further employed for a secondary horizontal reactor which extends the controlled reaction time and temperature of the fuel gas and char from improved solid/gas and gas/gas reactions according to the invention.

The of carpet, rug, polymeric waste sources and other waste sources undergo the conversion in the reactor(s) for an amount of time sufficient to provide at least partial conversion and substantially as set forth according to the methods of U.S. Publication No. 2014/0182194. In an aspect, the amount of retention time in a reactor(s) varies from at least about 20 minutes, at least about 30 minutes, at least about 40 minutes, at least about 50 minutes, or at least about 60 minutes as may vary based upon factors including for example the shredded size of the input source which impacts the gasification reaction, and the like.

In an aspect, the pressure in the reactor(s) is held constant within a pressure range from about 10 to about 100 millibar, or preferably from about 20 to about 50 millibar.

In an aspect, a moisture content of a waste input source may be measured to determine whether moisture is to be added to the system for improved gasification. In an aspect, steam is generated via heat exchanger and the process steam is injected through pipelines directly into a reactor(s) head to increase moisture content. In an aspect, a waste input source having a low moisture content, such as below about 10%, below about 9%, below about 8%, below about 7%, below about 6%, below about 5%, below about 4%, below about 3%, below about 2%, or less, will have steam injected into the process to improve the gasification reaction. In an aspect, steam is added to the reactor(s) head to increase moisture content to at least about 10% to improve the gasification process of the low density input of the feedstock.

In an additional aspect, monitoring of the pressure in the reactors can be employed to determine if further moisture is to be added to the system for improved gasification. In such an aspect the reactor system controls automatically adjust volume of steam based on temperature and pressure in the reactor to optimize the gasification reaction.

In an aspect, the methods further include a tar and oil cracking step. As one skilled in the art appreciates, tars and oils are an unavoidable product of the pyrolysis process, which are a non-heterogeneous mixture of olefins and paraffins, which contain tars and hazardous component. These hazardous components include carcinogenous benzene, toluene and chlorinated-brominated components, if PVC and/or flame retardants are present in the plastics feedstock. The pyrolytic oils have a low flash point and are known to be extremely hazardous (often requiring hazardous regulatory permits in various countries). Beneficially, according to the invention such unavoidably created tars and oils are merely an intermediate and are subsequently cracked. As referred to herein, "cracking" refers to the process whereby complex organic molecules are broken down into simpler molecules, such as light hydrocarbons, by the breaking of carbon-carbon bonds in the precursors. Thus cracking describes any type of splitting of molecules under the influence of heat, catalysts and solvents. Accordingly, tars and oils are not collected or an output of the thermolysis methods of the invention. In an aspect, a further gas converter (cracking reactor) will be employed, such as where higher organic components are further degraded. This removal and conversion of these heavy oils or tars into Clean Fuel Gas is desired to remove these materials which selectively absorb halogenated hazardous substances. In an aspect, the step recycles tars and oils in order to remove the hazardous halogenated compounds. In a further aspect, the tar and oil cracking step has the beneficial effect of creating more clean fuel gas.

In an aspect, the generated tars and oils are processed in the presence of an optional catalyst, such as for example zeolite. In an embodiment, the cracking step separates light and heavy oils, such as disclosed for example in U.S. Patent Publication No. 2014/0182194, which is incorporated herein by reference in its entirety.

In an aspect, the methods may further include an optional cooling step for the gas. In some embodiments, the gas will be cooled due to further processing in a scrubbing stage. For example, a cooled conversion chamber may be in connection with a reactor according to the methods of the invention. In an aspect, a gas at a temperature from about 400° C.-800° C. is cooled to a temperature below about 100° C., or preferably below about 80° C. The gas may further thereafter be cooled to an ambient temperature, such as in an adjacent water scrubber to remove any excess water and/or steam from the gas.

In an aspect, the methods may further include a conditioning step, such as employing and additional gas scrubbers. In an embodiment, gas produced may be further purified following cooling at a gas scrubbing stage, i.e. an alkaline stage (for example, NaOH for the binding of HCl and HBr) and fed to the downstream process.

In an aspect, the invention converts the carpet, rug, polymeric waste sources and other waste sources into a Char source and a Clean Fuel Gas source. In an aspect, the invention will further include a recycling step for the recycling of any oils and tars created from the methods described herein. In an aspect, the recycling of the oils and tars involves cracking them and then reprocessing the shorter chain molecules into a main reactor to be converted into additional Clean Fuel Gas. The cracking can occur at a temperature range of from about 350° C. to about 1100° C. and may be in the presence of catalysts, such as zeolites. In an aspect, the generated tars and oils are processed in the presence of an optional catalyst, such as for example zeolite. In an embodiment, the cracking step separates light and heavy oils, such as disclosed for example in U.S. Patent Publication No. 2014/0182194, which is incorporated herein by reference in its entirety.

In a beneficial aspect of the invention, such generated Clean Fuel Gas is suitable for use in maintaining operation of the processes of the invention at a point of use (i.e. facility employing the methods, systems, and/or processes of the present invention).

In an aspect, the invention further includes a separation step for the further processing of the generated Char source. In one embodiment, a carbon conversion unit can be employed to remove carbon from a Char source. In an embodiment, it is desirable to separate carbon from fillers contained in the Char source (such as mineral fillers including calcium and/or magnesium carbonate), which can completed on site or off site by known separation methods. In an embodiment, the separated carbon from the Char source is provided for applications of use (e.g. carbon/charcoal input for concrete, steel mills). In an embodiment, the separated mineral fillers from the Char source are provided for applications of use (e.g. input for carpet filler). In another embodiment, the intact Char source is provided as an input for further recycling.

In one embodiment, a carbon conversion unit can be employed to remove carbon from a Char source. Beneficially, the generated Char source has undergone about a 40%, 50% or greater reduction (weight basis) as a result of the thermolysis processing according to the invention which removes the organics and thereafter can be further separated the remaining components. In an aspect it is desirable to remove additional carbon from the Char source, such that there is a great than 50% (weight basis) reduction of carbon in the Char source. In a preferred embodiment, the carbon is reduced to less than 10% (weight basis). In a preferred embodiment the carbon is removed from the Char source.

In an aspect, the further processing of the Char source can include the use of ozone to convert carbon to a fuel gas (in the form of carbon dioxide or carbon monoxide which thereafter are further processed through the scrubbers). In such an embodiment, ozone can be added to a chamber containing the Char (at either room or ambient temperature or at elevated temperatures, such as 100 to 300° C.). Such a chamber could be one of the reactors or a separate chamber. In an aspect, the use of ozone to convert carbon to a fuel gas obviates the use of a cold incineration process.

In an aspect, the further processing of the Char source incinerates the carbon in the residue at controlled temperatures, such as from about 300° C. to about 500° C. The air supply is temperature controlled and the whole process can be cooled, such as to a temperature from about 300° C. to about 500° C. In an aspect, the equipment includes or consists of an infeed screw conveyor, a rotary calciner with flights and register pipes for heat transfer, a cooled exit screw conveyor, exhaust gas cleaning unit with particulate removal and optional scrubbing devices.

In an aspect, the infeed screw conveyor has a conventional design and the temperature of the co-product is the main parameter for its specification. The temperature of the co-product will be increased by indirect heating and controlled air supply before it enters the rotary calciner.

In an aspect, the rotary calciner has a basic design of an elongated drum with two bearings, an inner drum with flights and a central output screw conveyor. Input and Output are symmetrical located. The drive is at the head of the rotary calciner. Input and output of the material is done via the shaft and thus gas proof to the atmosphere. A pipe register in two levels inside the drum will cool the process. The material can be transported by the inner flights into the output screw conveyor. The material can be continuously transported through the rotary calciner at a constant temperature and constant cooling. Moreover, carbon oxidizes to $CO_2$ in this process.

In an aspect, the output screw conveyor has a conventional design with a cooling jacket and connected to the storage vessel.

In an aspect, the exhaust gas cleaning module has a conventional particulate removal system and can be optionally equipped with a gas scrubber with solid removal. A fan can be added if necessary before entering the stack.

In an aspect, the invention further includes a cleaning step for the further processing of the generated fuel gas. Such step may be referred to as a "wet scrubbing" step. For example, such a step is particularly useful in applications for the further processing when mercury-containing compounds were included in the processed waste source. Such step may also include the removal of mercury having formed a mercury halide, which may be as an insoluble halogen salt in water which is removed in the scrubber. In an aspect, the mercury halide is scrubbed out in the scrubber and thereafter disposed. In an aspect, the gas is introduced as a gas flow into a wet scrubber for purification. In an aspect, the gas scrubber(s) separate tars, oils and Char from the product gas flow. In a further aspect, the gas scrubber(s) can further cool the product gas, for example to a temperature below about 80° C. The scrubber(s) may further be employed for a final removal step for any toxic compounds in the fuel gas product.

In an aspect, the produced fuel gas/water vapor mixture enters the gas cleaning, i.e. scrubber system. In an aspect, each reactor line has its own first gas cleaning unit. The gas streams are combined after the first scrubber units and will enter the additional scrubbers afterwards.

In an aspect, the gas cleaning units include or consist of scrubbers, vessels, pumps, oil discharge units and heat exchangers. Water combined with additives, such as for example an alkalinity source (e.g. NaOH) or other source such as limestone for removal of sulfur, which are known to those skilled in the art of incineration technologies. Notably, the heating methods according to the invention are distinct from incineration as external heating is provided. For clarity, the methods of the invention do not employ incineration. Those skilled in the incineration arts understand scrubbing using water containing alkaline materials to remove acidic components are distinct methods. These are used in a closed loop system to clean condensates and contaminants out of the gas stream and to cool the gas down. The condensates contain olefins, aromatics and paraffins as solids and water. The standard system includes or consists of five gas cleaning systems. This amount can be reduced or increased depending on the feedstock specifications employed according to embodiments of the invention. The scrubbed components like tar will be the feedstock of the cracking reactors, the light oil fraction of aromatic oil and olefins will be separated from the solids/water and reprocessed in the gasification system and the water will be pre-cleaned and reused.

In an aspect, the fuel gas is transported through the gas cleaning system by increasing the pressure, such as to about 100 mbar by ventilation systems. In an aspect, 100 mbar is the limit value for the system employed according to the invention.

In an aspect, the waste water treatment includes or consists of a physical and biological treatment segment. The waste water can be discharged after pre-treatment and cleaning.

In an aspect, the safety system transports the fuel gas to a flare in case of an emergency. In an aspect, all the pipelines have valves, which automatically open in case of a power failure. In a further aspect, the connecting pipes to the flare are equipped with burst discs, which will prevent excessive pressure in the reactors and the gas cleaning systems. In case of an emergency, this system will help to shut down the system in a safe manner.

Exemplary Embodiment for Processing Waste Sources

In an aspect, a waste input material is stored in an hopper and transported by the first screw conveyor as the first drying unit, which may consists of several connected units. In an aspect, the screw conveyors are indirectly heated by the exhaust gas of the reactor gas burners after it is cooled by heat exchangers to 350 C. In an aspect, the discharge points of the water vapor are between the screw conveyors and are supported by slightly negative pressure and the vapor is collected for condensation.

In an aspect, the waste input material is fed by the last screw conveyor through an air-lock system into the primary reactor unit. The first primary cracking and gasification reactions occur in this vertical reactor unit. The material is fed through the upper part of the reactor, the reactor head, and into the upper mixing chamber. The mixing chambers and the high-temperature chambers are indirectly heated through gas burners at the outer wall of the reactor. In an aspect, the material flow inside the reactor is controlled by an internal screw conveyor and a rotor unit.

In an aspect, the mixing and high-temperature chambers are enclosed by the outer burning chamber, which is heated by gas-burners capable to run on Natural Gas or the clean fuel gas generated by the systems of the invention after it is cleaned in the scrubbing system.

In an aspect, the exhaust gas of the gas burners is utilized to dry the waste input material, if the waste source is in need of drying. In an embodiment, the desired moisture content should be in the range of about 1-25%, or preferably from about 5-20%.

In an aspect, the produced fuel gas and the coke are ducted into the first of two secondary reactors at the bottom of the vertical reactor. In an aspect, these reactor units are nearly horizontal and are also indirectly heated screw conveyor units. Additional gasification of the material and gas reactions occurs in the secondary reactor units. They are heated by their own burner units.

In an aspect, the remaining residues are coke and ash and they are discharged at the end of the second secondary reactor unit after being cooled down with steam/water.

In an aspect, additional cracking reactors are integrated in the gasification system. These are independent heated pipe reactors, which are designed to handle any tar components, which are being condensated in the first scrubber unit. The tars are being cracked and the fuel gas will be ducted back into the first secondary reactor.

In an aspect, the entire system is secured for the case of excessive pressure. Burst discs at the main gas distribution points and the reactors ensure that any gas will be ducted to a flare and being burnt. In an aspect, water Vapor can be injected into the burning chamber to cool down the primary reactor and stop the gasification reactions inside the reactor.

In an aspect, the produced fuel gas/water vapor mixture enters a gas cleaning/scrubber system. Each reactor line has its own first gas cleaning unit. The gas streams are combined after the first scrubber units and will enter the additional scrubbers afterwards. In an aspect, the gas cleaning units consists of scrubbers, vessels, pumps, oil discharge units and heat exchangers. Water combined with additives are used in a closed loop system to clean condensates and contaminants out of the gas stream and to cool the gas down. The condensates contain olefins, aromatics and paraffins as solids and water. In an aspect, the system consists of five gas cleaning systems. This amount can be reduced or increased depending on the feedstock specifications. The scrubbed components like tar will be the feedstock of the cracking reactors, the light oil fraction of aromatic oil and olefins will be separated from the solids/water and reprocessed in the gasification system and the water will be pre-cleaned and reused.

In an aspect, the fuel gas is transported through the gas cleaning system by increasing the pressure to 100 mbar by ventilation systems. 100 mbar is the limit value for the whole system. In an aspect, these components are redundant and can be bypassed.

In an aspect, the waste water treatment consists of a physical and biological treatment segment. The waste water can be discharged after pre-treatment and cleaning.

In an aspect, the safety system transports the fuel gas to a flare in case of an emergency. All the pipelines have valves, which automatically open in case of a power failure. The connecting pipes to the flare are equipped with burst discs, which will prevent excessive pressure in the reactors and the gas cleaning systems. In case of an emergency, this system will help to shut down the system in a safe manner.

Optional Additions for Enhanced Processing and Efficiency of Thermolysis Methods The methods of the present invention are suitable for combination with additional inputs to further maximize the efficiency of the methods and systems employed. It is known that power generation equipment is designed to perform at best efficiencies for converting the supplied fuel into power at a specified range of fuel load. This range for gas turbines and gas engines is generally in the 80% to 100% fuel gas capacity of the selected gas turbine or gas engine. Efficiency is determined as thermal energy required in the fuel gas to generate power and provided by the vendors in BTU/kWh valid for the specified range of 80% to 100% capacity fuel gas load of their equipment. As one skilled in the art will ascertain, fuel gas loads of <80% will decrease the efficiency of converting the thermal energy of the fuel gas into power.

According to optional embodiments of the invention, the clean fuel gas source output according to the methods of the invention can be further enhanced and/or stabilized to a constant output, such as measured on a cfm (cubic feet per minute) and the heating value of the clean fuel gas source constantly controlled in BTU/cuft. The quantity and the heating value of the clean fuel gas source are dependent on the feedstock properties processed according to the embodiments of the invention. A homogenous feedstock Input into the reactors will yield a consistent clean fuel gas source Output for both parameters: cfm and heating value per cuft supplied to a gas turbine/engine. Fluctuations in the feedstock will change the quantity of the generated clean fuel gas source and its heating value per cuft. For example, according to various embodiments of the invention were distinct waste sources are employed, such as the differences between polyamide carpet with PET versus polypropylene carpet, according the clean fuel gas output will varying according to cfm and BTU/cuft. Accordingly, the methods of the invention may be further controlled for the output of clean fuel gas source by adding Natural Gas in a pre-mixing storage vessel with the clean fuel gas source before supplying it as fuel, such as to a gas turbine/engine.

In an aspect, the addition of natural gas (such as methane) to the clean fuel gas source output of the invention has various advantages. For example the variations in BTU quality from feed stock irregularities from suppliers and among types of waste feedstock processed according to the invention can be overcome by the addition of natural gas to regulate BTU to a user's specification. In an aspect, both high and low end feed stock and the gas can be used to equalize or optimize a combined cycle output. The use of the natural gas also allows management of power production during shut downs, maintenance or other interruptions, and can assist in cold start-ups. Overall, it is unexpected that the BTU variations from feedstocks, along with other benefits of cost efficiencies, balanced feed stock performance, down time and maintenance downtime tolerances, and ability to add a larger back end power system to reduce costs, are obtained by the present invention.

In an aspect, the added Natural Gas can equalize any fluctuations in the gas flow quantity of the clean fuel gas source and the blend of the two combined gas streams will ensure the necessary supply of total gas to a gas turbine/engine to achieve the 80% to 100% fuel gas load for optimized performance of the power generation equipment. In addition, adding Natural Gas to the available clean fuel gas source capacity can increase the total capacity of power generation at a project site. Still further, substituting the clean fuel gas source by Natural Gas during maintenance periods of the systems employed provides a redundancy in power generation for the duration of the shut-down of the system.

Additional sources of fuel can be utilized in the methods of the invention, including those listed below as "Additional Fuel Sources" with the exemplary BTU for each input source.

Generated Outputs of the Thermolysis Methods

In an aspect, the methods, systems, and/or processes of the present invention convert the carpet, rug, polymeric waste sources and other waste sources into a Char source and a Clean Fuel Gas source. Beneficially, the hydrocarbon materials from the carpet, rug and other polymeric waste input are converted to the Clean Fuel Gas while the other materials are collected as "Char." As a further benefit, any oils and tars created are recycled into the secondary reactor and cracking reactor to be converted into additional fuel gas, such as may be employed to maintain operation of the processes of the invention at a point of use (i.e. facility employing the methods, systems, and/or processes of the present invention).

Char

The methods according to the invention employing the thermolysis methods beneficially provide a processed Char which is a non-hazardous material. In an aspect, the Char is substantially-free or free of toxic chemicals. The Char must be cooled down before opening to air to prevent formation of hazardous dioxins and furans (e.g. less than about 120° C.).

In an aspect, the Char is a carbon-rich material. In an aspect, the Char is a mineral filler-rich material, including for example one or more of calcium carbonate and/or magnesium carbonate. In an embodiment, the Char source generated will have a variable composition dependent upon the type of carpet, rug and/or other polymeric material processed according to the invention. An exemplary composition is substantially as set forth in Tables 3 and 6 below, showing the ability to further separate and reuse fillers according to an aspect of the invention.

In an aspect, the Char comprises from about 4% to about 96% carbon and from about 4% to about 96% filler material depending upon the Input feedstock properties. In an aspect, the Char comprises from about 4% to about 96% carbon, from about 5% to about 90% carbon, from about 10% to about 80% carbon, from about 20% to about 75% carbon, or from about 25% to about 75% carbon depending upon the Input feedstock properties. In an aspect, the Char comprises from about 4% to about 96% filler material, from about 5% to about 90% filler material, from about 10% to about 90% filler material, from about 20% to about 90% filler material, or from about 25% to about 80% filler material depending upon the Input feedstock properties.

In an aspect, the Char is substantially-free of halogen compounds. In a further aspect, the Char is substantially-free of toxic chemicals and halogen compounds. In an aspect, the Char is free of toxic chemicals, including for example mercury-containing compounds. In an aspect, the Char is free of halogen compounds. In a further aspect, the Char is free of toxic chemicals and halogen compounds.

Fuel Source

The methods according to the invention employing the thermolysis methods beneficially provide a clean fuel source. In an aspect, the fuel gas source is a clean, non-hazardous material. In an aspect, the fuel gas source is substantially-free of toxic chemicals. In an aspect, the fuel gas source is substantially-free of halogen compounds. In a further aspect, the fuel gas source is substantially-free of toxic chemicals and halogen compounds. In an aspect, the fuel gas source is free of toxic chemicals. In an aspect, the fuel gas source is free of halogen compounds. In a further aspect, the fuel gas source is free of toxic chemicals and halogen compounds. In an aspect, the fuel source is substantially-free or free of polycyclic aromatic hydrocarbons (PAHs), halogenated dibenzodioxins, halogenated dibenzofurans, biphenyls, and/or pyrenes.

In an embodiment, the fuel gas generated is utilized for heating the reactor(s) for the system and methods of the thermolysis methods of the invention. In an aspect, the heat for the reactor(s) is supplied by about 10-50% of the generated fuel gas, about 10-40% of the generated fuel gas, or about 20-30% of the generated fuel gas.

In an embodiment, the fuel gas generated has a composition substantially as set forth in the Tables in the examples below.

In an aspect, the fuel gas is a superior product as a result of no air or external oxygen introduced into the reactors, such as is common in pyrolysis and/or partial oxidation systems.

In an embodiment of the invention the thermolysis of carpet, rug, polymeric waste sources and other waste sources, such as solid waste, tires, manure, auto shredder residue, glass and carbon fiber composite materials, municipal solid wastes, medical wastes, waste wood and the like, contain from about 3,000 to about 20,000 BTUs per pound of the of carpet, rug and other polymeric waste, producing a Clean Fuel Gas as an energy source. As one skilled in the art will ascertain based on the disclosure of the invention set forth herein, differences in of carpet, rug, polymeric waste sources and other waste sources will impact the BTUs per pound. For example, selvage will provide an estimated 16,800 BTU/pound, PET input will provide an estimated 7,000-8,000 BTU/pound, PA input will provide an estimated 6,000-7,000 BTU/pound, and PP input will provide an estimated 14,000-15,000 BTU/pound. According to still further aspects, various waste sources will provide the following estimated BTU/pound:

| | |
|---|---|
| Polypropylene | 19,000 |
| Polyurethane Foam | 11,600 |
| PS-Foam packaging | 17,700 |
| HDPE | 19,000 |
| Polycarbonate | 18,850 |
| PMMA-Acrylic | 10,750 |
| Composite Resins | 12,850 |
| LDPE/LLDPE | 12,050 |
| LDPE Foam | 17,600 |
| PVC | 8,250 |
| PET | 10,500 |
| Nylon | 13,700 |
| FR-Nylon | 12,500 |
| Auto Shredder Residue | 11,200 |
| Auto Tires | 15,000 |
| Neoprene Rubber | 12,800 |
| Non-recycled Plastics | 15,300 |
| Other Fuel Sources | |
| Natural Gas | 20,300 |
| Crude Oil | 18,400 |
| US Coal #1 | 11,200 |
| Wood (20% H$_2$O) | 6,000 |
| Manure (dried) | 6,800 |
| Manure (20% H$_2$O) | 5,400 |
| Tar & Oil Residues | 16,600 |
| Sewage Sludge (dried) | 6,000 |

In an aspect, the heating value of the generated fuel gas source will vary accordingly based on the type of carpet, rug and other polymeric waste source. For example, in a non-limiting embodiment, the heating value of fuel gas generated from the following input sources according to the data generated in the Examples is approximately PET 438 BTU/ft$^3$ and PA 567 BTU/ft$^3$. According to an aspect of the invention, the heating value of fuel gas generated from the carpet, rug and/or polymeric material input sources is from about 400 BTU/ft$^3$ to about 1,400 BTU/ft$^3$. In an aspect, notably, the evaluated fuel gas met all emission requirements evaluated.

In an aspect, the heating value of the generated fuel gas source generated from solid waste input sources is from about 600 BTU/ft$^3$ to about 900 BTU/ft$^3$. In an aspect, notably, the evaluated fuel gas met all emission requirements evaluated.

In an aspect, the heating value of the generated fuel gas source generated from tire input sources is from about 800 BTU/ft$^3$ to about 1200 BTU/ft$^3$. In an aspect, notably, the evaluated fuel gas met all emission requirements evaluated.

In an aspect, the heating value of the generated fuel gas source generated from manure input sources is from about 400 BTU/ft$^3$ to about 600 BTU/ft$^3$. In an aspect, notably, the evaluated fuel gas met all emission requirements evaluated.

In an aspect, the heating value of the generated fuel gas source generated from auto shredder residue (ASR) input sources is from about 600 BTU/ft$^3$ to about 900 BTU/ft$^3$. In an aspect, notably, the evaluated fuel gas met all emission requirements evaluated.

In an aspect, the heating value of the generated fuel gas source generated from composite material input sources is from about 400 BTU/ft$^3$ to about 800 BTU/ft$^3$. In an aspect, notably, the evaluated fuel gas met all emission requirements evaluated.

In an aspect, the heating value of the generated fuel gas source generated from municipal solid wastes, medical wastes, waste wood and the like as input sources is from about 400 BTU/ft$^3$ to about 800 BTU/ft$^3$. In an aspect, notably, the evaluated fuel gas met all emission requirements evaluated.

In an aspect, the generation of the fuel gas is suitable for various applications of use. In an embodiment, the generated fuel source can be used to generate electricity using engines or gas turbines to power a manufacturing plant and/or boilers as a replacement for natural gas and/or electricity. In another aspect, the fuel gas can be used for burners, or steam and electricity production and/or distribution. Many examples of such uses are well known to practitioners of the art.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The disclosure of each reference set forth herein this patent application is incorporated herein by reference in its entirety.

Example 1

Systems and apparatus for processing distinct types of carpet waste—nylon and polyester. Apparatus and processing system for carpet and rug waste sources—namely carpet tile samples—were evaluated at a pilot plant in Forst, Germany for the assessment of product features and material balances as disclosed pursuant to the embodiments of the invention. The target of the test was to prove the technical capabilities of a plant with a continuous feed of the delivered waste and to yield specific products (gas and char) and operating parameter for further evaluation. The methods according to the invention were evaluated to confirm gas output having a suitable composition with high methane, hydrogen and carbon monoxide content for further usage, and hydrogen bromide or hydrogen chloride neutralized in the gas scrubbers with sodium hydroxide. The methods according to the invention were evaluated to confirm complete destruction of VOCs and other toxic components, along with the measurement of any potentially hazardous components and VCOs to assess suitability of the processes for use in factories. The mass balances were also assessed to determine whether the resulting Char source can be recycled.

Parameters of the test operation. PET and Nylon-based carpet samples were supplied by Interface, Inc. for evaluation. Approximately 120 kilograms of PET and Nylon-based carpet feedstock was received and inspected. The feedstock had been shredded to <2 inches for the test. The reactor substantially as depicted in FIG. 1 had been cleaned before the test. Process software and sensors were adjusted to record the operating conditions. The material handling and infeed conditions were adjusted before the test. Technical adjustments for this specific feedstock were implemented as outlined below.

Continuous processing. A continuous plant operation was conducted after heating the system up with controlled feedstock input and product discharge. The operating parameters were adjusted to the requirements of the feedstock. The resulting materials and media were sampled and documented. A total of two gas samples, a feedstock sample from each feedstock type and a Char sample from each char for both PET and PA were obtained for further analysis. The analysis of the samples was carried out by a certified independent laboratory.

Standard operating conditions of the plant included the following preparation of the plant for the operation: Start-up of the plant: 7:00 am; Feedstock Input: from 10:00 am; Sampling between 12:00 and 14:30 pm; Completion of plant operation: until 17:00 pm; Discharge of products and media, Recording of the yielded products for the mass balance.

General conditions. The feedstock had been shredded and was fed according to the test protocol. The start-up process included the heating of the reactors and the adjustments of the gas scrubbing units and adjacent plant components. The operating conditions were adjusted to the test plant as outlined below.

Plant conditions. The plant operation during the test used the standard configuration of the system and used specific adjustments for this feedstock—These adjustments included:

Plant operation with the lower (one) burner only;

Feedstock infeed periodically in short intervals due to the low density of the PET and PA as infeed chamber emptied (although this would not be a required limitation in a commercial size plant employing the methods and processes of the invention);

Wood chips were added during startup to PET to support light feedstock into conveyors and achieve minimum base level of operation (although this would not be a required limitation in a commercial size plant employing the methods and processes of the invention);

Reactor conditions with temperatures of 450° C. to 800° C. at the reactor top and 400° C. to 800° C. at the lower parts of the reactor;

Pressure levels of the system was increased between 5 mbar and 100 mbar;

Steam generation via heat exchanger and injection of the process steam through pipelines directly into the reactor head to increase moisture content to about 10% to improve gasification process of the low density input by increasing moisture content of the feedstock;

Cracker-module for generated condensates (e.g. light oils) was not in operation, because the volume of these oils was too low for an efficient operation;

The product gas was piped from the reactor to the gas cleaning units;

The condensates were scrubbed out in the gas cleaning units from the generated gas. Oily components (oligomers) were generated from both feedstock samples, which were completely condensed in scrubbing unit 2. The oily components from the PET feedstock passed through Scrubber 1 due to its operating conditions. A small fraction of the oily components from the PA feedstock was scrubbed out in unit 1. A decrease in the scrubbing media temperature is required to achieve a nearly complete condensation of these components in Scrubber 1. The condensates show a high density due to a high fraction of oligomers. No oily components were recorded in Scrubber 3 and only water from the gas fraction was condensed in Scrubber 3. The control valves in the gas piping system recorded also no condensates from the gas. The gas cleaning operational parameters and conditions were not changed for both tests and the system operated as expected.

Water was added to gas scrubber 1 although level equalization was not required and controlled oil separation and condensation occurred); and The operation of the gas scrubbers was carried out without recirculation; Level control in scrubber 1 and 2 by manual adjustments of the correct level; and Control of the oil water separator between the scrubbers and the gas pipeline of the plant during operation.

Special conditions of the test operation. The selected basic operating parameters were continuously monitored and needed only miniscule adjustments. The PET was fed into the processor in short bursts due to the low material density and limits of the screw feed. Steam was injected to increase the moisture content and pressure fluctuations were seen in output. The water content in the reactor was slightly increased by steam injection, which increased the gas generation due to the chemical balance reactions. The gas volume was constantly measured. The generated gas volume during phases of increased feedstock supply was 30 m$^3$/hr. and above, the average value was 30 m$^3$/hr. and above, with the average value of about 20 m$^3$/hr.

The scrubber operated at normal stationary conditions. The differential pressure was in the range like differential pressure in previous test runs from about 20-50 mbar.

No recirculation and injection of the generated oils from scrubbers 1 and 2. The low amount of oil components was removed from scrubbers 1 and 2 and collected.

The level control of the media during operation were adjusted constantly to its range level. Media in the first scrubber: oil, Media in the following scrubbers: water with additives. All generated media were removed after the test and measured for the mass balance.

No special technical adjustments were necessary during the test operation from the plant conditions described above. No technical failures occurred. The plant operated perfectly stably and its capability proven to process this feedstock.

Summary of apparatus and process set-up. The Input feedstock is being fed quasi-continuously by heated screw conveyors. Based upon the low bulk density of the PET and PA feedstock material, the Infeed speed and subsequently the throughput of the plant had to be adjusted to the characteristic bulk density of this feedstock. The feedstock reacts quickly in the main reactor at these temperature conditions and gasifies rapidly. This gasification profile was monitored by the pressure increase shortly after the feedstock was fed into the system. The observed pressure increase is not critical and can be equalized by a more constant feedstock input for a commercial size unit. Beneficially, the gasification and reaction speed of the tested feedstock described herein enables a high throughput volume. The generated gas is piped from the reactor into the gas scrubbing units, which remove the condensates from the gas stream. The condensates are then collected in scrubber 1 and 2 and their viscosity is suitable for reinjection into the process as a fuel source. Residual tars are not left over in the scrubbers.

Various operational parameters were adjusted including: throughput volumes for the Infeed screw conveyors; adjustments of the steam injections to balance out the reactions in the reactor; reactor temperatures; volume of feedstock input; and residence time dependent on Char removal. With these adjustments and the set-up described a stable plant operation was achieved.

Figure 2:
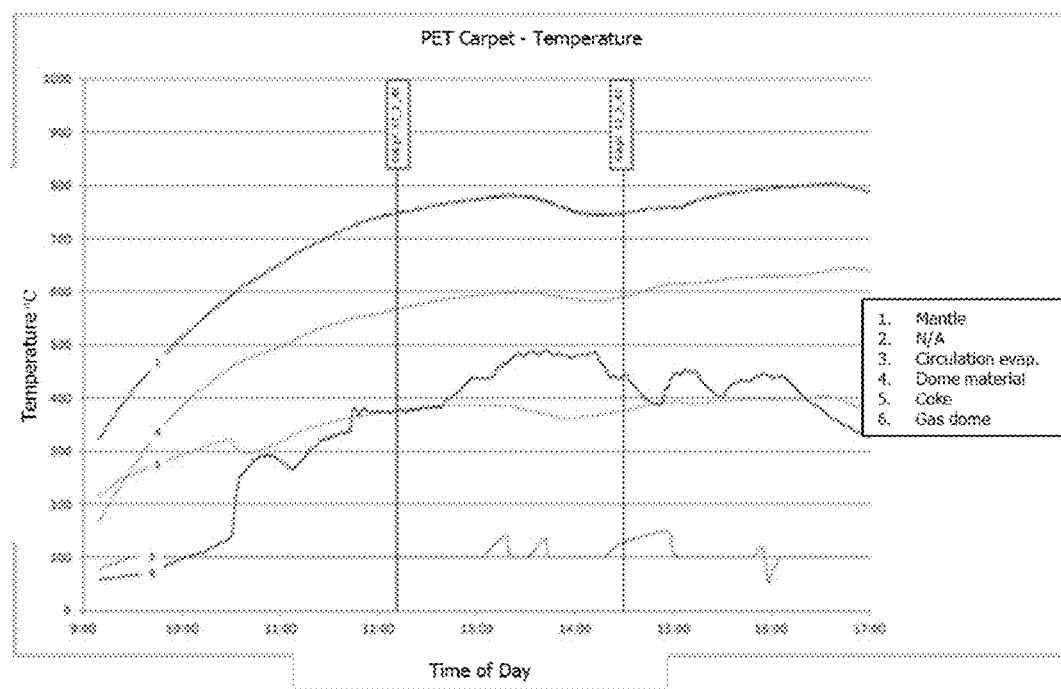
FIG. 2 shows a graph of temperature measurements from the PET-based carpet waste assessment described in Example 1 for processing according to the methods, systems, and/or processes of the present invention.
Figure 3:
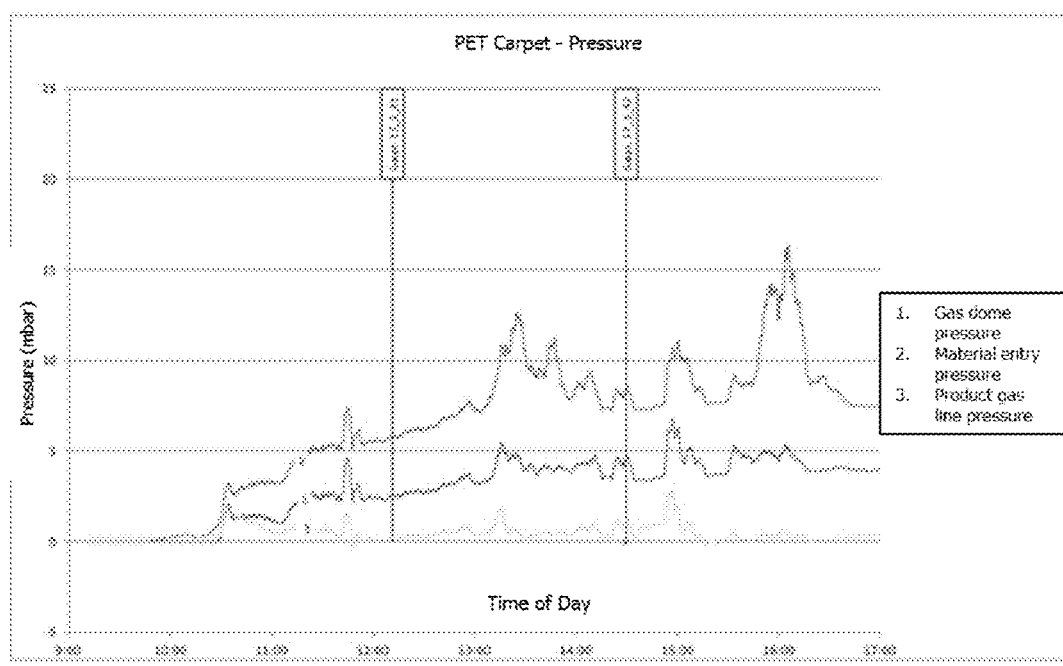
FIG. 3 shows a graph of pressure measurements from the PET-based carpet waste assessment described in Example 1 for processing according to the methods, systems, and/or processes of the present invention.

Summary of Mass Balance for PET.
Input: 120 kg PET (264 pounds), 17 kg $H_2O$
Average throughput: 30 kg/hour (66 pounds)
Output: 80.4 kg gas, 7.4 kg oil, 34.2 kg char, 15 kg $H_2O$ FIGS. 2-3 show the results for the PET-based carpet samples processed as described herein. FIG. 2 shows the temperature of the reaction. The temperature measurements (measured in degrees Celsius) show the temperatures in different parts of reactor. FIG. 3 shows the fluctuations of pressure in the output. As shown in FIG. 2, the Input material enters the top of the reactor and its temperature increases to 600 C inside the reactor. It is mixed with the already hot material inside the reactor and the chemical conversion reactions start. The fine particles of the feedstock are immediately gasified at the contact with the material already inside the reactor. This fast gasification effect can be observed by the short term pressure spikes (FIG. 3) inside the reactor immediately after feeding new material. This pressure increase is moderate and will be avoided by continuously feeding into the reactor. Notably, these effects will not occur in a commercial size plant due to a continuously operating infeed system and a larger reactor volume.

The gasification reaction speed was high despite the injection of additional steam. The steam injection was necessary to balance the gas-equilibrium reactions, it was manually adjusted and therefore not steady, which can be observed in the temperature curves. The achieved gasification reaction speeds for both materials will increase the potential throughput tremendously. A test period with delayed Input feeding as proof eliminated the pressure spikes.

Figure 4:
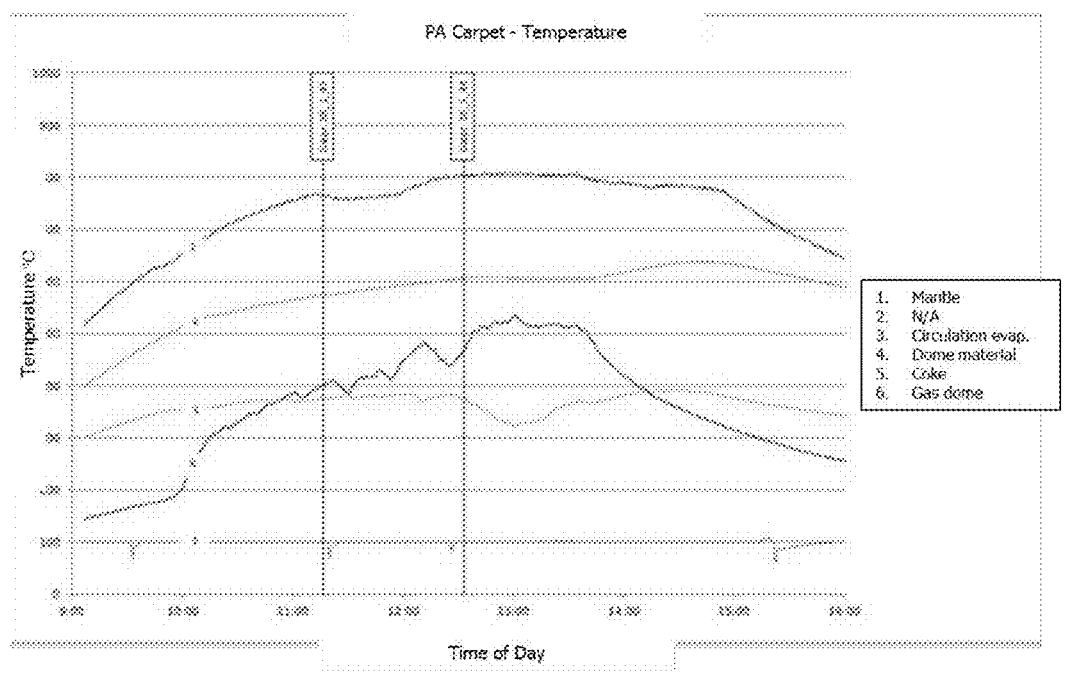
FIG. 4 shows a graph of temperature measurements from the PET-based carpet waste assessment described in Example 1 for processing according to the methods, systems, and/or processes of the present invention.
Figure 5:
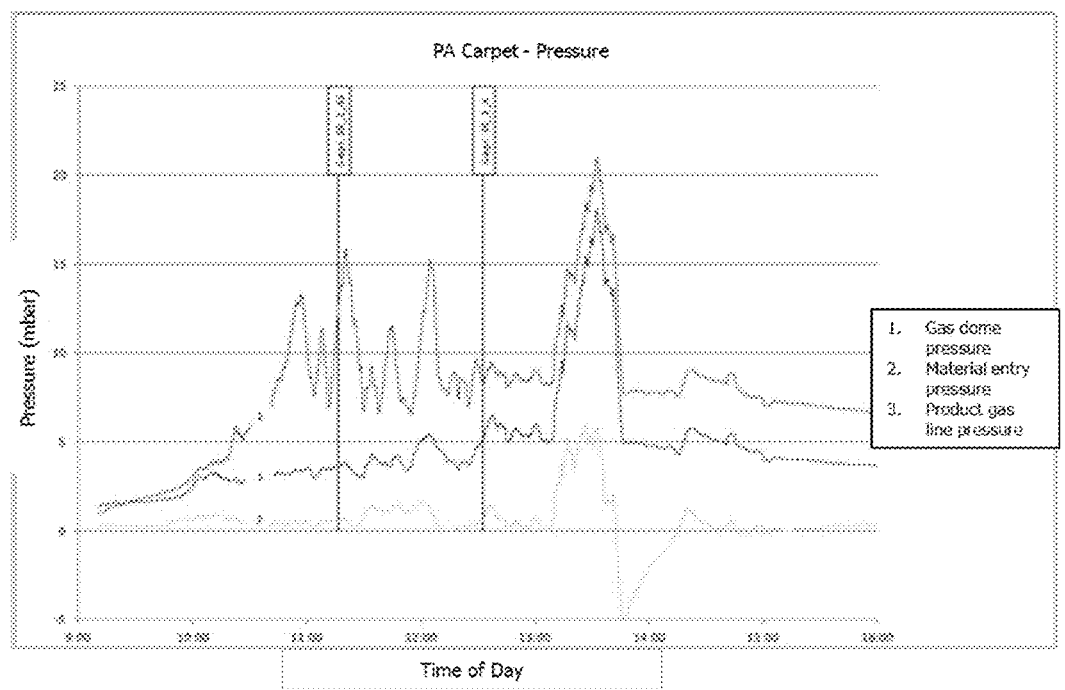
FIG. 5 shows a graph of pressure measurements from the PET-based carpet waste assessment described in Example 1 for processing according to the methods, systems, and/or processes of the present invention.
Figure 6A:
FIGS. 6A-6F show photographs of an exemplary materials recovery facility with sorted recyclables (FIG. 6A), baled recycling materials (FIG. 6B), PCC sorted by face fiber (FIG. 6C), MRF and recycling collection with a collection truck (FIG. 6D), baler with recyclable materials (FIG. 6E), and carpet bales of an exemplary dimension (FIG. 6F) suitable for processing according to the methods, systems, and/or processes of the present invention.
Figure 6B:
Figure 6C:
Figure 6D:
Figure 6E:
Figure 6F:

Summary of Mass Balance for Nylon (PA).
Input: 125 kg PA, 21 kg $H_2O$
Output: 84 kg gas, 10 kg oil, 38 kg char, 14 kg $H_2O$ FIGS. 4-5 show the results for the PA-based carpet samples processed as described herein. FIG. 4 shows the temperature of the reaction. The temperature measurements (measured in degrees Celsius) show the temperatures in different parts of reactor. FIG. 5 shows the fluctuations of pressure in the output.

Explanations of the operating conditions, measurement values and data. The plant was operated with a relative low reactor temperature in accordance with Pyrolyzer of 600 C to avoid chemical reactions in the mineral based filler materials. The necessary steam injection into the reactor top balanced the low moisture content of the feedstock material. The evaluation of the process data demonstrates a test progress with slight temperature changes and pressure spikes based upon the adjustments to increase the throughput and to supply sufficient steam. The feedstock infeed in short intervals and the increased gas production caused small pressure fluctuations of max 5 mbar. A pressure variation in that range is not significant for the operating conditions, but helpful for the test evaluation. The divergence of the pressure inside the reactor middle part and the top of the reactor is typical for the KUG system. These pressure variations are caused partially by operational process steps like transportation of the Char inside the secondary reactor for example. The adjustments for the steam injections can be observed in the pressure data as well.

The PET feedstock has a very low moisture content compared to previously tested feedstock materials. The reactor top temperature of 600 C is significantly higher in comparison to the other temperature control points and to previous test runs. This deviation was caused mostly by the low throughput. A plant operation of feedstock with a higher bulk density can be adjusted to higher throughputs and to a different temperature profile. The potential throughput of the PET feedstock could be increased by selecting a different infeed method for future test runs.

The evaluation of the process temperature data of the gas cleaning units are important for its performance and its condensing capabilities. Temperature in Scrubber 1 was at 70 C, in Scrubber 2 at 40 C and in Scrubber 3 at 35 C. We noticed differences in the condensate characteristics for the PET feedstock compared to previous test runs. No condensates were scrubbed out in Scrubber 1, the long-chained hydrocarbons condensed in Scrubber 2. Process water was condensed in Scrubber 3. The condensates from Scrubber 2 could be pumped. No condensates were in the product gas lines.

Example 2

Exemplary PET waste feedstock processing. Further assessment of the feedstock and outputs from the analysis in Example 1 was conducted. Table 1 shows the analysis of the PET feedstock composition.

TABLE 1

| Test parameters | Analysis Value | Units |
|---|---|---|
| Water Content | 1.1 | Ma.-% |
| Heating value | 7158 | BTU/lb. |
| Ash content | 17.7 | Ma.-% |
| Sulfur, total | 0.08 | Ma.-% |
| Chlorine | 1500 | mg/kg |
| Hydrogen | 4.69 | Ma.-% |
| Carbon | 49.3 | Ma.-% |
| Nitrogen | 0.46 | Ma.-% |
| Plant operation volumes | | |
| Input-total | 170 | kg |
| Average throughput after deduction of the cool down phase | 35 | kg/h |

The PET sample had a very low bulk density which can be further addressed in a commercial size plant with the infeed system adjusted to the low bulk density. The PET material also had a very low moisture content which was adjusted for by injection of process steam to reach an average moisture content of the waste input of about 10%. The low moisture content of the PET feedstock will decrease the own consumption of product gas for heating the reactors and therefore minimize the parasitic load and increase the overall efficiency. The ash content of nearly 20% did not present any difficulties for the conversion of the PET material.

Analysis of the Product Gas. The results of the analysis are shown in Table 2.

TABLE 2

| [Vol-%] | Product Gas (in Volume percentage) | | |
|---|---|---|---|
| | Gas 17_1_41 | Gas_17_1_42 | Average |
| $H_2$ | 22.6 | 20.6 | 21.6 |
| $CH_4$ | 21.3 | 16.1 | 18.7 |
| CO | 28.2 | 33.9 | 31.1 |
| $CO_2$ | 20.9 | 22.8 | 21.9 |
| Ethane | 1.0 | 1.4 | 1.2 |
| Ethene | 5.6 | 4.3 | 4.9 |
| Propane | 0.0 | 0.1 | 0.0 |
| Propene | 0.3 | 0.9 | 0.6 |
| i-Butane | 0.0 | 0.0 | 0.0 |
| n-Butane | 0.0 | 0.0 | 0.0 |
| Calorific value [BTU/ft3] | 457 | 423 | 438 |

Two gas samples were collected per each test and analyzed. The samples of the generated gas were collected in Phase 1 and Phase 2. The timing of the sampling was recorded in the temperature and pressure data and reflects the start phase of the test and the continuous operation of the testing. The analysis results reflect homogeneous operating conditions. The gas analysis shows relatively high Hydrogen content with a relative high content of Carbon oxides (especially CO) are typical for a feedstock with a higher Oxygen content from the Carboxyl group, which caused in combination with the conversion of the injected steam the generation of a high CO content. The $CO_2$ content is lower and caused by the chemical balance reactions. The difference between the 2 operational test phases was the Infeed of additional wood chips during start up. The molecular structure of PET consists mostly of aromatic compounds, which could not be completely cracked inside the reactor and transits into a liquid phase, which will be mixed with the generated oligomers and can be pumped at a temperature of 25 C to the Cracker unit.

The use of steam and wood chips in the process led to increased $CO_2$ and CO levels due to the low density of the PET and resulted in the low values of calorific value and Wobbe Index ($MJ/m^3$). The lower temperature of operation also led to reduced gas output. However, these limitations would not be present in a commercial-scaled plant which would adjust for continuous material input and simple screw feed adjustments.

Analysis of Char. The results of the analysis is shown in Tables 3 and 3A demonstrating the char is suitable for a fuel and/or recycling.

TABLE 3

| Char | | |
|---|---|---|
| Measured Parameter | Value | Unit |
| Carbon | 16.0 | Ma.-% |
| Hydrogen | 0.9 | Ma.-% |

TABLE 3-continued

| Char | | |
|---|---|---|
| Measured Parameter | Value | Unit |
| Char Filler material | 79.6 | Ma.-% |
| CaO | 3.5 | Ma.-% |

TABLE 3A

| Char Filler Material | | | |
|---|---|---|---|
| Element | 090111F-A Conventional "Calcium Carbonate" (µg/g) | QL (ppm) | QL (µg/g) |
| Silver | BQL | 0.20 | 100 |
| Aluminum | 2413 | 0.80 | 400 |
| Arsenic | BQL | 0.80 | 400 |
| Boron | BQL | 0.80 | 400 |
| Barium | BQL | 0.80 | 400 |
| Beryllium | BQL | 0.80 | 400 |
| Calcium | 326900 | 0.80 | 400 |
| Cadmium | BQL | 0.80 | 400 |
| Cobalt | BQL | 0.80 | 400 |
| Chromium | BQL | 0.80 | 400 |
| Copper | BQL | 0.80 | 400 |
| Iron | 3712 | 0.80 | 400 |
| Potassium | 161 | 4.00 | 2000 |
| Lithium | BQL | 0.80 | 400 |
| Magnesium | 65700 | 0.80 | 400 |
| Manganese | 156 | 0.80 | 400 |
| Molybdenum | BQL | 0.80 | 400 |
| Sodium | 53 | 0.80 | 400 |
| Nickel | BQL | 0.80 | 400 |
| Lead | BQL | 0.80 | 400 |
| Phosphorous | 372 | 4.00 | 2000 |
| Antimony | BQL | 0.80 | 400 |
| Selenium | BQL | 0.80 | 400 |
| Silicon | 4888 | 1.88 | 940 |
| Tin | BQL | 0.80 | 400 |
| Strontium | 117 | 0.80 | 400 |
| Thallium | BQL | 1.80 | 900 |
| Vanadium | BQL | 2.80 | 1400 |
| Zinc | BQL | 0.80 | 400 |
| Titanium | — | 1.80 | 900 |
| Sulfur | — | 2.80 | 1400 |

Analysis methods. The feedstock material and the Char were sampled according to the standard guidelines. The gas samples were collected in glass probes and shipped for analysis to an external certified laboratory. Only small volumes of oil-oligomers-tar mixture were created at the selected temperatures for the gasification of the carpet tile feedstocks and were removed after scrubbing. The mixture is separated by an internal oil-water separator and the light fraction will be converted to gas in the cracking reactor, the heavy fraction with the tars piped into the bottom of the first reactor for reprocessing in a commercial unit.

Overall results. The plant operation with the delivered feedstock was successful. The technical design of the pilot plant demonstrated the desired processing. A gas for multiple applications has been generated and a Char suitable for further processing was obtained. Further benefits include the confirmation that no dioxins generated and existing dioxins cracked, confirming reduction to practice of not creating any toxic materials. Accordingly, the pilot plant demonstrated a stable performance with neither the composition of the plastics nor the metals having any negative impact on the process.

Example 3

Exemplary PA Waste Feedstock Processing. Further assessment of the feedstock and outputs from the analysis in Example 1 was conducted. Table 4 shows the analysis of the PA feedstock composition.

TABLE 4

| Test parameters | Analysis Value | Units |
|---|---|---|
| Water Content | 1.3 | Ma.-% |
| Heating Value | 6762 | BTU/lb. |
| Ash content | 26.1 | Ma.-% |
| Sulfur. total | 0.06 | Ma.-% |
| Chlorine | 17000 | mg/kg |
| Hydrogen | 5.51 | Ma.-% |
| Carbon | 39.7 | Ma.-% |
| Nitrogen | 3.39 | Ma.-% |
| Plant operation volumes | | |
| Input-total | 125 | kg |
| Average throughput after deduction of the cool down phase | 365 | kg/h |

The high chlorine content shown in Table 4 was unexpected. Approximately 1.7% was removed by water scrubbers; however, notably the process is tolerant to at least about 7% chlorine. The nitrogen content was high as was expected based on the chemical composition of nylon (amide groups).

Analysis of the Product Gas. The results of the analysis are shown in Table 5.

TABLE 5

Product Gas (in Volume percentage)

| [Vol-%] | Gas 18_1_43 | Gas 18_1_44 | Average |
|---|---|---|---|
| $H_2$ | 22.8 | 20.1 | 21.5 |
| $CH_4$ | 27.8 | 23.6 | 25.7 |
| CO | 20.5 | 27.0 | 23.8 |
| $CO_2$ | 16.1 | 15.6 | 15.9 |
| Ethane | 1.9 | 2.2 | 2.1 |
| Ethene | 9.1 | 9.3 | 9.2 |
| Propane | 0.0 | 0.0 | 0.0 |
| Propene | 0.7 | 1.2 | 1.0 |
| i-Butane | 0.0 | 0.0 | 0.0 |
| n-Butane | 0.0 | 0.0 | 0.0 |
| N2 | 1.1 | 1.0 | 1.1 |
| Calorific value [BTU/ft3] | 570 | 561 | 567 |

The samples of the generated gas were collected in Phase 1 and Phase 2. The analysis results reflect homogeneous operating conditions. The use of steam (no wood chips were used for PA feedstock) in the process led to increased $CO_2$ and CO levels due to the low density and low water content of the PA and resulted in the low, yet satisfactory, values of calorific value and Wobbe Index ($MJ/m^3$). The lower temperature of operation also led to reduced gas output. The exclusion of wood chips resulted in a higher quality gas compared to the PET-generated fuel gas source. These limitations would not be present in a commercial-scaled plant which would adjust for continuous material input and simple screw feed adjustments.

Analysis of Char. The results of the analysis is shown in Table 6 demonstrating the char is suitable for a fuel and/or recycling.

TABLE 6

| Char | | |
|---|---|---|
| Measured Parameter | Value | Unit |
| Carbon | 16.0 | Ma.-% |
| Hydrogen | 0.9 | Ma.-% |
| Char Filler material | 81.2 | Ma.-% |
| CaO | 1.9 | Ma.-% |

As shown in Table 6, the analysis results for the Char show it is a suitable source for fuel or further recycling. The results indicate the char contained 1.9% CaO. CaO will absorb $CO_2$ from the air and turn into $CaCO_3$.

Analysis methods. The feedstock material and the Char were sampled according to the standard guidelines. The gas samples were collected in glass probes and shipped for analysis to an external certified laboratory. Only small volumes of oil-oligomers-tar mixture were created at the selected temperatures for the gasification of the carpet tile feedstocks and were removed after scrubbing. The mixture is separated by an internal oil-water separator and the light fraction will be converted to gas in the cracking reactor, the heavy fraction with the tars piped into the bottom of the first reactor for reprocessing in a commercial unit.

Overall results. The plant operation with the delivered feedstock was successful. The technical design of the pilot plant demonstrated the desired processing of the waste feedstock. A gas for multiple applications has been generated and a Char suitable for further processing was obtained. Further benefits include the confirmation that no dioxins generated and existing dioxins cracked, confirming reduction to practice of not creating any toxic materials resulting from the waste source. Accordingly, the pilot plant demonstrated a stable performance with neither the composition of the plastics nor the metals having any negative impact on the process.

Example 4

Comparison of PET and PA Waste Feedstock Processing. A comparison of the feedstock and outputs from the analysis in Examples 2-3 was conducted. A comparison of the gas generated from the PET and PA feedstocks is shown in Table 7.

TABLE 7

| Main components [Vol-%] | PET Average | PA Average |
|---|---|---|
| $H_2$ | 21.6 | 21.5 |
| $CH_4$ | 18.7 | 25.7 |
| CO | 31.1 | 23.8 |
| $CO_2$ | 21.9 | 15.9 |
| Ethane | 1.2 | 2.1 |
| Ethene | 4.9 | 9.2 |
| Propane | 0.0 | 0.0 |
| Propene | 0.6 | 1.0 |
| i-Butane | 0.0 | 0.0 |
| n-Butane | 0.0 | 0.0 |
| N2 | 0.0 | 1.1 |
| Calorific value [BTU/ft3] | 438 | 567 |

The calorific values of both were lower than expected for four reasons. First, there was low bulk density of the samples led to intermittent gas production (despite excellent melting of both samples. Second, the additional steam used in the process led to increased $CO_2$ and CO levels (caused by the low water content of both PET and PA (~1% vs. 15% desired). Third, wood chips were used to help PET start which produced a lower calorific value. Fourth, the operating temperature led to increased conversion (however a lower BTU/ft3 and increased $H_2$ production). Notably, each of these limitations are addressed by a scale up or commercial plant due to the following: achieve complete conversion at lower temperatures, with increased BTU/ft3 value; adjust feeds for continuous material input; and no steam needed if moisture controlled.

Example 5

Analysis of VOCs for PET and PA Waste Feedstock Processing. VOC emissions were measured during both tests using: VOC M 100 Room Indoor Air Quality Monitor/Alarm to measure room temperature, humidity and approximately 70 VOCs.

The following test results were obtained:
Values inside the plant building were: 9 to 12 PPM
Values inside the office rooms were: 11 to 15 PPM
Values in the exhaust gas of the burned generated synthesis gas were: <1 PPM These values suggest that permitting a commercial plant using these materials will not be limited by the VOC emissions. Beneficially, according to the invention, the processing of carpet, rug and other polymeric materials results in gas components and composition meeting the specific requirements of modern gas engines to provide a fuel source from a waste source. In particular, the output gas is suitable for operating boilers for steam or gas engines for electricity. The char is suitable for further recycling. As a result, the enter process of the invention results in a suitable method for recycling of waste carpet, rug and other polymeric materials.

Example 6

Exemplary Materials Recycling for Carpet, Rug and Other Polymeric Waste Feedstock Processing and Enhancements of Blending Natural Gas.

As set forth according to embodiments of the invention, various carpet, rug and other polymeric materials are particularly well suited for processing according to the methods of the invention to generate a clean fuel source and a Char. Various inputs described herein are shown in FIGS. 6A-6F photographs of an exemplary material source from a recovery facility with sorted recyclables (6A), baled recycling materials (6B), PCC sorted by face fiber (6C), MRF and recycling collection with a collection truck (6D), baler with recyclable materials (6E), and carpet bales of an exemplary dimension (6F) suitable for processing according to the methods, systems, and/or processes of the present invention.

A Wobbe Index calculation ($MJ/m^3$) was compared for processing of carpet waste with and without a natural gas source streamed into the system. The Wobbe Index is used to compare the combustion energy output of different composition fuel gases. The following demonstrates the value of supplementing natural gas as an input to the fuel source generated. Table 8 shows a fuel gas composition from carpet feedstock alone generated according to exemplary methods (as set forth in Examples 2-3) having a Wobbe index of 38.5326 $MJ/m^3$ compared to a fuel gas composition by adding 100% Natural Gas having a Wobbe index of 40.66621 $MJ/m^3$.

TABLE 8

| Composition | Vol % Composition without NG | Vol % Composition (with NG) |
| --- | --- | --- |
| Carbon monoxide | 17.7 | 8.85 |
| Carbon dioxide | 6.6 | 3.3 |
| Hydrogen | 19 | 19 |
| Oxygen | 0 | 0 |
| Nitrogen | 0 | 0 |
| Methane | 25.1 | 52.05 |
| Ethane | 10.2 | 5.1 |
| Propane | 2 | 2 |
| i-Butane | 0 | 0 |
| n-Butane | 0 | 0 |
| n-Pentane | 0 | 0 |
| n-Hexane | 0 | 0 |
| Propene | 10.9 | 5.45 |
| iso-Butene | 0 | 0 |
| Cyclohexane | 0 | 0 |
| Ethylene | 8.5 | 4.25 |
| Wobbe Index | 38.5326 $MJ/m^3$ | 40.66621 $MJ/m^3$ |

As shown in Table 8, 50% of the total gas will was generated by the thermolysis methods according to the invention and 50% from natural gas.

Example 7

Additional clean fuel gas samples from various waste sources were summarized as shown in Table 9 utilizing the methods of the present invention and calculating the Higher Heating Value (HHV) [BTU/cft].

TABLE 9

| Symbol | | Wood-Timber [%]$_{Vol.}$ | Plastics [%]$_{Vol.}$ | Tires [%]$_{Vol.}$ | MSW-separated [%]$_{Vol.}$ |
| --- | --- | --- | --- | --- | --- |
| CO | Carbon monoxide | 15 | 4 | 2 | 16 |
| $CO_2$ | Carbon dioxide | 20 | 2 | 2 | 15 |
| $H_2$ | Hydrogen | 26 | 42 | 15 | 20 |
| $O_2$ | Oxygen | 0 | 0 | 0 | 0 |
| $N_2$ | Nitrogen | 6 | 2 | 2 | 2 |
| CH4 | Methane | 20 | 26 | 48 | 29 |
| $C_2H_6$ | Ethane | 3 | 6 | 8 | 4 |
| $C_3H_8$ | Propane | 2 | 1 | 6 | 4 |
| $C_4H_{10}$ | i-Butane | 1 | 1 | 1 | 1 |
| $C_4H_{10}$ | n-Butane | 1 | 1 | 1 | 1 |
| $C_5H_{12}$ | n-Pentane | 1 | 0 | 0 | 1 |
| $C_6H_{14}$ | n-Hexane | 0 | 0 | 0 | 0 |
| $C_2H_4$ | Ethene | 1 | 7 | 6 | 1 |
| $C_3H_6$ | Propene | 2 | 7 | 6 | 4 |
| $C_4H_8$ | iso-Butene | 1 | 0 | 1 | 1 |
| $C_6H_{12}$ | Cyclohexane | 0 | 0 | 1 | 0 |
| $C_2H_4$ | Ethylene | 1 | 1 | 1 | 1 |
| Total [%/vol.] | | 100.00 | 100.00 | 100.00 | 100 |
| HHV BTU/cft | | 500 | 700 | 1100 | 700 |

Example 8

Evaluation of Pine/wood Waste Feedstock Processing. A comparison of the feedstock and outputs utilizing the thermolysis processing according to the invention is provided in Table 10.

TABLE 10

| Main components | Pine [Vol-%] | BTU/cft |
|---|---|---|
| Carbon monoxide | 28 | 321.6 |
| Carbon dioxide | 22.3 | 0 |
| Hydrogen | 24 | 274.9 |
| Oxygen | 0 | 0 |
| Nitrogen | 0 | 0 |
| Methane | 20 | 914.5 |
| Ethane | 2 | 1639 |
| Propane | 0.03 | 2372 |
| i-Butane | 0 | 3142 |
| n-Butane | 0 | 3142 |
| n-Pentane | 0 | 3716 |
| n-Hexane | 0 | 4412 |
| Propene | 0.4 | 2233 |
| iso-Butene | 0 | 2980 |
| Cyclohexane | 0 | 4212 |
| Ethylene | 3.27 | 1514 |

Example 9

Evaluation of Refuse Derived Fuel (RDF) Feedstock Processing. Refuse-derived fuel (RDF) is a fuel produced by shredding and dehydrating solid waste (MSW) with a Waste converter technology. RDF consists largely of combustible components of municipal waste such as plastics and biodegradable waste. A comparison of the feedstock and outputs utilizing the thermolysis processing according to the invention is provided in Table 11.

TABLE 11

| Main components | Pine [Vol-%] | BTU/cft |
|---|---|---|
| Carbon monoxide | 16 | 321.6 |
| Carbon dioxide | 15 | 0 |
| Hydrogen | 20 | 274.9 |
| Oxygen | 0 | 0 |
| Nitrogen | 2 | 0 |
| Methane | 29 | 914.5 |
| Ethane | 4 | 1639 |
| Propane | 4 | 2372 |
| i-Butane | 1 | 3142 |
| n-Butane | 1 | 3142 |
| n-Pentane | 1 | 3716 |
| n-Hexane | 1 | 4412 |
| Propene | 4 | 2233 |
| iso-Butene | 1 | 2980 |
| Cyclohexane | 0 | 4212 |
| Ethylene | 1 | 1514 |
| Wobbe-Index | 32.56 MJ/m³ | |
| Calorific value | 838 BTU/ft³ | |

Example 10

Evaluation of ASR Feedstock Processing. A comparison of the Automotive Shredded Residue feedstock and outputs utilizing the thermolysis processing according to the invention is provided in Table 12 and 13 (US units).

TABLE 12

| | Volume | | Volume | | Heating Value | | Energy (thermal) | |
|---|---|---|---|---|---|---|---|---|
| Input | | | | | | | | |
| ASR | 6.680 | kg/hr | 50.000 | metric tons/yr | 17.325 | kJ/kg | 241.100 | MWh/yr |
| Output | | | | | | | | |
| Gas (net) | 2.250 | m3/hr | 16.875.000 | m3/yr | 6.5 | kWh/m3 | 110.000 | MWh/yr |
| Char | 950 | kg/hr | 7.125 | metric tons/yr | 6 | kWh/kg | 42.750 | MWh/yr |
| Oil | 450 | kg/hr | 3.375 | metric tons/yr | 10 | kWh/kg | 33.750 | MWh/yr |
| Inert | 900 | kg/hr | 6.750 | metric tons/yr | | | | |
| Water | 1.200 | m3/hr | 9.000 | m3/yr | | | | |
| Gas* | 800 | m3/hr | 6.000.000 | m3/yr | 6.5 | kWh/m3 | 39.000 | MWh/yr |

*own consumption

TABLE 13

| | Volume | | Volume | | Heating Value | | Energy (thermal) | |
|---|---|---|---|---|---|---|---|---|
| Input | | | | | | | | |
| ASR | 14.723 | lb/hr | 55.100 | US tons/yr | 7.450 | BTU/lb | 822.667 | MMBTU/yr |
| Output | | | | | | | | |
| Gas (net) | 79.458 | Cft/hr | 595.933.875 | Cft/yr | 628 | BTU/cft | 375.336 | MMBTU/yr |
| Char | 2093.8 | lb/hr | 7.852 | US tons/yr | 9.289 | BTU/lb | 145.869 | MMBTU/yr |
| Oil | 991.8 | lb/hr | 3.719 | US tons/yr | 15481 | BTU/lb | 115.160 | MMBTU/yr |
| Inert | 1983.6 | lb/hr | 7.439 | US tons/yr | | | | |
| Water | 42.378 | Cft/hr | 317.831 | Cft/yr | | | | |
| Gas* | 28.252 | Cft/hr | 211.887.600 | Cft/yr | 628 | BTU/cft | 133.073 | MMBTU/yr |

*own consumption

What is claimed is:

1. A method for converting a composite waste source to a Clean Fuel Gas source and Char source comprising:
inputting a waste source into a thermolysis system;
wherein the thermolysis system comprises at least two reactors, at least two gas scrubbers, an oil/water separator, and an oil/tar cracker;
destroying and/or removing toxic compounds present in the waste source; and
generating the Clean Fuel Gas and Char source,
wherein the reactors have a process temperature of about 300° C-800° C. and generate tars and oils;
wherein all of the oils and tars are separated from the Clean Fuel Gas source in the at least two gas scrubbers, thereafter cracked in the oil/tar cracker, and sent back to the secondary reactor to generate more of the Clean Fuel Gas source;
wherein the Clean Fuel Gas source and Char source are substantially-free of halogenated organic compounds and do not contain oils and/or tars.

2. The method of claim 1, wherein the composite waste source comprises glass composite, carbon fiber composite, or a combination thereof.

3. The method of claim 1, wherein the heating value of the generated Clean Fuel Gas source generated from composite material is between about 400 BTU/ft$^3$ to about 800 BTU/ft$^3$.

4. The method of claim 1, wherein at least a portion of the Clean Fuel Gas source generated is provided back to the thermolysis system as a fuel source, and wherein from about 3,000 to 20,000 BTUs per pound of the waste source is generated.

5. The method of claim 1, wherein the reactors have a process temperature of about 400° C.-800° C.

6. The method of claim 1, wherein the reactors have a process temperature of about 400° C.-600° C.

7. The method of claim 1, wherein the thermolysis system provides indirect heat in the system that is free of oxygen, and wherein the thermolysis system has a pressure range from about 10 to about 100 millibar.

8. The method of claim 1, further comprising an initial step of shredding or grinding the waste source to provide a substantially uniform size of the waste source.

9. The method of claim 1, wherein the moisture content of the waste source is measured or the pressure in the reactor is measured and steam is injected into the reactor to increase moisture content of the waste source to about 5-20wt-% or the waste source is dried to decrease moisture content of the waste source to about 5-20 wt-%.

10. The method of claim 1, wherein the Char source comprises carbon and fillers, and wherein the Char source is suitable for further recycling and/or an additional step of removing the fillers from the carbon for further reuse of the carbon and/or fillers.

11. The method of claim 1, wherein the toxic compounds comprise aromatics and polycyclic aromatic hydrocarbons, halogenated dibenzodioxins, halogenated dibenzofurans, biphenyls, pyrenes, cadmium, lead, antimony, arsenic, beryllium, chlorofluorocarbons, mercury, nickel, or a combination thereof.

12. The method of claim 1, wherein the compounds destroyed comprise a toxic halogenated organic compound, and wherein the method does not generate any toxic halogenated organic compounds in the process of converting the waste sources to the Char and Clean Fuel Gas source.

13. The method of claim 1, wherein the waste source has a retention time of at least about 20 minutes in the reactors.

14. The method of claim 1, wherein the Char source and the Clean Fuel Gas source are free of halogenated organic compounds.

* * * * *